(12) United States Patent
Schemmann et al.

(10) Patent No.: US 10,250,959 B2
(45) Date of Patent: *Apr. 2, 2019

(54) OPTICAL AND RF TECHNIQUES FOR AGGREGATION OF PHOTO DIODE ARRAYS

(71) Applicant: ARRIS Enterprises LLC, Suwanee, GA (US)

(72) Inventors: Marcel F. Schemmann, Maria Hoop (NL); Venkatesh G. Mutalik, Middletown, CT (US); John Chrostowski, Warrington, PA (US); Amarildo Vieira, Philadelphia, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 150 days.

This patent is subject to a terminal disclaimer.

(21) Appl. No.: 15/589,065

(22) Filed: May 8, 2017

(65) Prior Publication Data

US 2017/0245031 A1  Aug. 24, 2017

Related U.S. Application Data

(63) Continuation of application No. 14/679,235, filed on Apr. 6, 2015, now Pat. No. 9,686,014.

(Continued)

(51) Int. Cl.
*H04Q 11/00* (2006.01)
*H04B 10/2575* (2013.01)
(Continued)

(52) U.S. Cl.
CPC ..... *H04Q 11/0067* (2013.01); *H01S 3/06754* (2013.01); *H01S 3/1608* (2013.01);
(Continued)

(58) Field of Classification Search
CPC ............ H04B 10/25751; H04B 10/075; H04B 10/2503; H04B 10/25753; H04Q 11/0067;
(Continued)

(56) References Cited

U.S. PATENT DOCUMENTS 5,001,336 A  3/1991 de la Chapelle
5,262,883 A  11/1993 Pidgeon et al.
(Continued)

FOREIGN PATENT DOCUMENTS

CN    202841136 U    3/2013
EP    1235434 A2    10/2005
(Continued)

OTHER PUBLICATIONS

"OBI free", retrieved from the Internet at <http://www.emc-web.com/J_emc/index.php?option=com_content&view=article&id=165:obi-free&catid=47:paper&Itemid=182\> on Mar. 24, 2015.
(Continued)

*Primary Examiner* — Leslie C Pascal
(74) *Attorney, Agent, or Firm* — Lori Anne D. Swanson

(57) ABSTRACT

An active receiver structure that combines a large number of detectors without bandwidth penalty may provide a better signal-to-noise ratio (SNR) than conventional Radio Frequency over Glass (RFoG) networks. A transmission line receiver is used to combine a large number of optical detectors into a single radio frequency (RF) signal without a bandwidth penalty and a modest penalty in noise performance that results in an SNR that is much better than traditional optical combining techniques that are followed by a single detector. An optical multiplexer structure may be designed around the active splitter such that passive optical network (PON) operation is not impeded.

29 Claims, 14 Drawing Sheets

Related U.S. Application Data

(60) Provisional application No. 61/982,089, filed on Apr. 21, 2014, provisional application No. 62/043,779, filed on Aug. 29, 2014, provisional application No. 62/043,793, filed on Aug. 29, 2014.

(51) Int. Cl.
*H04J 14/02* (2006.01)
*H04B 10/075* (2013.01)
*H01S 3/067* (2006.01)
*H01S 3/16* (2006.01)

(52) U.S. Cl.
CPC ..... *H04B 10/075* (2013.01); *H04B 10/25751* (2013.01); *H04B 10/25753* (2013.01); *H04J 14/02* (2013.01); *H04J 14/0205* (2013.01); *H04J 14/0212* (2013.01); *H04J 14/0221* (2013.01); *H04J 14/0282* (2013.01); *H04Q 2011/0015* (2013.01); *H04Q 2011/0016* (2013.01)

(58) Field of Classification Search
CPC ..... H04Q 2011/0016; H04Q 2011/0015; H04J 14/02; H04J 14/0212; H04J 14/0205; H01S 3/06754; H01S 3/1608
See application file for complete search history.

(56) References Cited

U.S. PATENT DOCUMENTS

| | | | |
|---|---|---|---|
| 5,331,449 A | 7/1994 | Huber et al. | |
| 5,914,799 A | 6/1999 | Tan | |
| 6,041,056 A | 3/2000 | Bigham et al. | |
| 6,194,964 B1 | 2/2001 | Jun | |
| 7,941,022 B1 | 5/2011 | Schaffner et al. | |
| 8,837,953 B2 | 9/2014 | Mutalik et al. | |
| 8,953,941 B2 | 2/2015 | Lutgen et al. | |
| 9,686,014 B2 * | 6/2017 | Schemmann | H04B 10/25751 |
| 2002/0061163 A1 | 5/2002 | Bartur et al. | |
| 2002/0154371 A1 | 10/2002 | West, Jr. | |
| 2003/0090777 A1 | 5/2003 | Yap | |
| 2003/0128983 A1 | 7/2003 | BuAbbud et al. | |
| 2006/0153520 A1 | 7/2006 | Murphy et al. | |
| 2007/0086713 A1 | 4/2007 | Ingmar et al. | |
| 2009/0257748 A1 | 10/2009 | Nemoto | |
| 2010/0083330 A1 | 4/2010 | Bernstein et al. | |
| 2010/0303471 A1 | 12/2010 | Khalouf et al. | |
| 2011/0069956 A1 | 3/2011 | Biegert et al. | |
| 2011/0078755 A1 | 3/2011 | Dai | |
| 2012/0043584 A1 | 2/2012 | Joshi et al. | |
| 2012/0148241 A1 | 6/2012 | Piehler et al. | |
| 2012/0308237 A1 | 12/2012 | Mutalik et al. | |
| 2013/0259469 A1 | 10/2013 | Smith et al. | |
| 2014/0010555 A1 | 1/2014 | Lentz et al. | |
| 2014/0050471 A1 | 2/2014 | Bernasconi | |
| 2014/0369689 A1 | 12/2014 | Gadkari et al. | |

FOREIGN PATENT DOCUMENTS

| | | |
|---|---|---|
| EP | 2530861 A2 | 12/2012 |
| JP | 2007005968 A | 1/2007 |
| WO | 2001074077 A1 | 10/2001 |
| WO | 2013016450 A1 | 1/2013 |
| WO | 2013/036945 A1 | 3/2013 |

OTHER PUBLICATIONS

A. Tan, "Super Pon—A Fiber to the Home Cable Network for CATV and POTS/ISDN/VOD as Economical as a Coaxial Cable Network", Journal of Lightwave Technology, vol. 15, No. 2, Feb. 1997, pp. 213-218.

"HRL Laboratories, LLC: About Us", retrieved from the Internet at <http://www.hrl.com/aboutUs/abt_main.html> on Mar. 24, 2015.

A. Al-Banna, et al., "Beat it! Handling Optical Beat Interference in RFOG Systems", ARRIS White Paper, ARRIS Enterprises, Inc., 2014, 31 pgs.

V. Mutalik, et al., "Partnership for Extended Capacity: DOCSIS 3.1 with RFoG", ARRIS White Paper, 2013, 18 pgs.

V. Mutalik, et al., "Partnership for Extended Capacity: DOCSIS 3.1 with RFoG", ARRIS PowerPoint Presentation, 2014 Spring Technical Forum, Apr. 30, 2014.

Official Action, Re: Canadian Application No. 2,946,397, dated Jul. 31, 2017.

* cited by examiner

| | GPON | 1G-EPON | XGPON1 | 10G/1G-EPON | 10G/10G-EPON | UNITS |
|---|---|---|---|---|---|---|
| SPEC | ITU-T G.984 | IEEE 802.3BK-2013 | ITU-T G.987 | IEEE 802.3BK-2013 | IEEE 802.3BK-2013 | |
| PON RATE | 2.488G / 1.244G | 1.25G/1.25G | 10G/2.5G | 10G/1.25G | 10G/10G | GBPS |
| DS λ | 1480 - 1500 | 1480-1500 | 1575-1580 | 1575-1580 | 1575-1580 | nm |
| US λ | 1310 ±20 | 1310±50 | 1260-1280 | 1310±50 | 1270±10 | nm |
| SPLIT RATIO | 1:128 | 1:64 | 1:128 | 1:64 | 1:64 | |
| MAX REACH | 20 (A, B, C)<br>40 (B+, C)<br>60 (C+) | PX10: ≥10 (1:16)<br>PX20: ≥10 (1:32),<br>≥20 (1:16)<br>PX30: 20 (1:32)<br>PX40: 20 (1:64) | 20, 40 | PRX10: ≥10 (1:16)<br>PRX20: ≥10 (1:32)<br>≥20 (1:16)<br>PRX30: 20 (1:32)<br>PRX40: 20 (1:64) | PR10: ≥10 (1:16)<br>PR20: ≥10 (1:32),<br>≥20 (1:16)<br>PR30: 20 (1:32)<br>PR40: 20 (1:64) | km |

*FIG. 13*

OPTICAL AND RF TECHNIQUES FOR AGGREGATION OF PHOTO DIODE ARRAYS

CROSS-REFERENCE TO RELATED APPLICATIONS

This application claims the benefit of priority under 35 U.S.C. § 119(e) to U.S. Provisional Application No. 61/982,089, filed on Apr. 21, 2014, U.S. Provisional Application No. 62/043,779, filed on Aug. 29, 2014, and U.S. Provisional Application No. 62/043,793, filed on August 29, the entire disclosures of each incorporated herein by reference.

Also, this application is related to U.S. application Ser. No. 14/625,187 entitled "Active Optical Combiner for CATV Network" filed Feb. 18, 2015, and U.S. application Ser. No. 14/625,613 entitled "Systems and Methods for Burst Detection in a CATV Network" filed on Feb. 18, 2015, the entire disclosures of each incorporated herein by reference.

BACKGROUND

Although Cable Television (CATV) networks originally delivered content to subscribers over large distances using an exclusively RF transmission system, modern CATV transmission systems have replaced much of the RF transmission path with a more effective optical network, creating a hybrid transmission system where cable content originates and terminates as RF signals over coaxial cables, but is converted to optical signals for transmission over the bulk of the intervening distance between the content provider and the subscriber. Specifically, CATV networks include a head end at the content provider for receiving RF signals representing many channels of content. The head end receives the respective RF content signals, multiplexes them using an RF combining network, converts the combined RF signal to an optical signal (typically by using the RF signal to modulate a laser) and outputs the optical signal to a fiber-optic network that communicates the signal to one or more nodes, each proximate a group of subscribers. The node then reverses the conversion process by de-multiplexing the received optical signal and converting it back to an RF signal so that it can be received by viewers.

Cable television (CATV) networks have continuously evolved since first being deployed as relatively simple systems that delivered video channels one-way from a content provider. Early systems included transmitters that assigned a number of CATV channels to separate frequency bands, each of approximately 6 MHz. Subsequent advancements permitted limited return communication from the subscribers back to the content provider either through a dedicated, small low-frequency signal propagated onto the coaxial network. Modern CATV networks, however, provide for not only a much greater number of channels of content, but also provide data services (such as Internet access) that require much greater bandwidth to be assigned for both forward and return paths. In the specification, the drawings, and the claims, the terms "forward path" and "downstream" may be interchangeably used to refer to a path from a head end to a node, a node to an end-user, or a head end to an end user. Conversely, the terms "return path", "reverse path" and "upstream" may be interchangeably used to refer to a path from an end user to a node, a node to a head end, or an end user to a head end.

Recent improvements in CATV architectures that provide further improvements in delivery of content include Fiber-to-the Premises (FTTP) architectures that replace the coaxial network between a node and a subscriber's home with a fiber-optic network. Such architectures are also called Radio Frequency over Glass (RFoG) architectures. A key benefit of RFoG is that it provides for faster connection speeds and more bandwidth than current coaxial transmission paths are capable of delivering. For example, a single copper coaxial pair conductor can carry six phone calls, while a single fiber pair can carry more than 2.5 million phone calls simultaneously. FTTP also allows consumers to bundle their communications services to receive telephone, video, audio, television, any other digital data products or services simultaneously.

One existing impairment of RFoG communication channels is Optical Beat Interference (OBI), which afflicts traditional RFoG networks. OBI occurs when two or more reverse path transmitters are powered on, and are very close in wavelength to each other. OBI limits upstream traffic, but also can limit downstream traffic. Existing efforts at mitigating OBI have focused on Optical Network Units (ONUs) at the customer premises, or on the CMTS at the head end. For example, some attempts to mitigate OBI make the ONUs wavelength specific while other attempts create an RFoG-aware scheduler in the CMTS. Still others attempts have included changing ONU wavelengths on the fly. Due to the fundamental nature of lasers and DOCSIS traffic, none of the above techniques yield satisfactory results as wavelength collisions still occur or cost is high. Thus, it may be desirable in RFoG deployments to further reduce or eliminate OBI.

Optical Beat Interference (OBI) and the limited return link budget are problems in RFoG return networks (see http://www.scte.org/documents/pdf/Standards/ANSI_SCTE_174_2010.pdf for an overview of RFoG networks). In such networks typically a star splitter distributes light over 32 subscribers, the same splitter combines return light from the 32 subscribers at a penalty of 15 dB of loss. Also the optical combining of multiple sources at nominally the same wavelength can cause optical beat interference such that the information content can be overwhelmed by noise.

RFoG suffers from a high loss in the optical path resulting in low SNR as well as from optical beat interference (OBI) resulting in very high noise levels occasionally disabling reverse signal reception. RFoG systems are often intended as a stepping stone to PON system deployment at a later date. Conventional implementations use multiple receivers that are RF combined, but these techniques result in much higher cost, power dissipation and poorer noise performance.

Thus, RFoG systems with improved SNR, particularly in the presence of OBI, are desirable.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings:

FIG. 13 depicts a table of example PON wavelengths values for the disclosed receiver to support PON pass-through capabilities.

Figure 1:
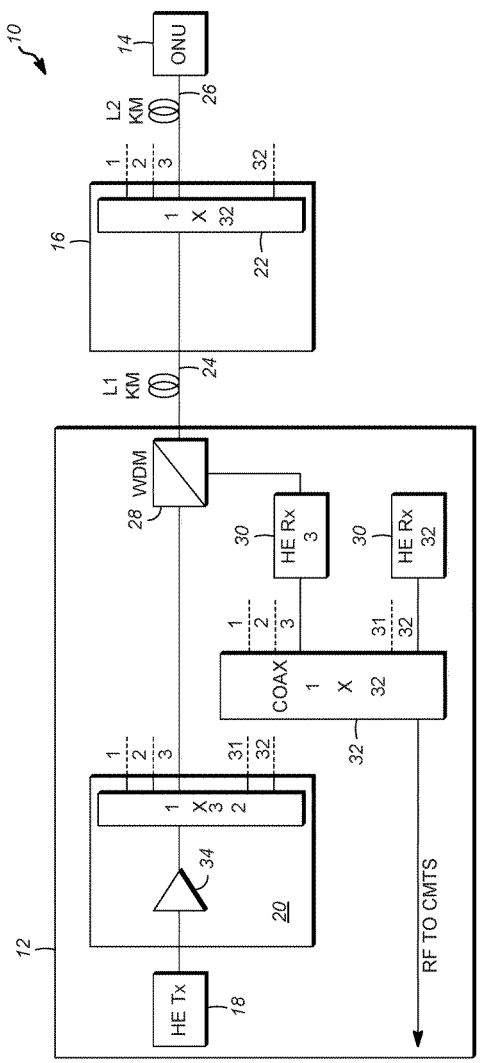
FIG. 1 depicts a radio frequency over glass (RFoG) architecture.

It is noted that while the accompanying Figures serve to illustrate embodiments of concepts that include the claimed invention, and explain various principles and advantages of those embodiments, the concepts displayed are not necessary to understand the embodiments of the present invention, as the details depicted in the Figures would be readily apparent to those of ordinary skill in the art having the benefit of the description herein.

DESCRIPTION

Disclosed are embodiments for an active receiver structure that combines a large number of detectors without bandwidth penalty and provides a better signal-to-noise ratio (SNR) than conventional Radio Frequency over Glass (RFoG) networks. In embodiments, an optical multiplexer structure is designed around the active splitter such that passive optical network (PON) operation is not impeded. In embodiments, the active receiver handles RFoG signals, not PON signals. Disclosed in more detail below is a transmission line receiver proposed to combine a large number of optical detectors into a single radio frequency (RF) signal without a bandwidth penalty and a modest penalty in noise performance that results in an SNR that is much better than traditional optical combining techniques that are followed by a single detector. Existing optical combining techniques are not designed to handle active combining of RF signals and passive PON splitting in one small unit.

Modern cable television (CATV) transmission systems have replaced much of the legacy radio frequency (RF) transmission path with a more effective optical network, creating a hybrid transmission system where cable content originates and terminates as RF signals over coaxial cables, but is converted to optical signals for transmission over the bulk of the intervening distance between the content provider and the subscriber. Specifically, CATV networks include a head end at the content provider for receiving RF signals representing many channels of content. The head end may receive the respective RF content signals, multiplex the signals using an RF combining network, convert the combined RF signal to an optical signal (e.g., by using the RF signal to modulate a laser) and output the optical signal to a fiber-optic network that communicates the signal to one or more nodes, each proximate to a group of subscribers. The node may then reverse the conversion process by de-multiplexing the received optical signal and converting it back to an RF signal so that it can be received by viewers.

Improvements to CATV architectures that provide further improvements in delivery of content include Fiber-to-the Premises (FTTP) architectures that replace the coaxial network between a node and a subscriber's home with a fiber-optic network. Such architectures are also called Radio Frequency over Glass (RFoG) architectures. A benefit of RFoG is that it provides for faster connection speeds and more bandwidth than current coaxial transmission paths are capable of delivering. For example, a single copper coaxial pair conductor can carry six phone calls, while a single fiber pair can carry more than 2.5 million phone calls simultaneously. FTTP also allows consumers to bundle their communications services to receive telephone, video, audio, television, any other digital data products or services simultaneously.

In telecommunications, radio frequency over glass (RFoG) is a deep-fiber network design in which the coax portion of the hybrid fiber coax (HFC) network is replaced by a single-fiber passive optical network (PON). The Society of Cable and Telecommunications Engineers (SCTE) has approved standards for implementing RFoG, also approved by the American National Standard Institute (ANSI).

An RFoG topology may include an all-fiber service from the headend to a field node or optical network unit (ONU), which is typically located at or near the user's premises. In a cable network headend, a downstream laser may send a broadcast signal that is optically split multiple times. The optical network unit, or ONU, recovers the RF broadcast signal and passes it into the subscriber's coax network. Downstream and return-path transmission use different wavelengths to share the same fiber (typically 1,550 nm downstream, and 1,310 nm or 1,590/1,610 nm upstream). The return-path wavelength standard is expected to be 1,610 nm, but early deployments have used 1,590 nm. Using 1,590/1,610 nm for the return path allows the fiber infrastructure to support both RFoG and a standards-based PON simultaneously, operating with 1,490 nm downstream and 1,310 nm return-path wavelengths. Both RFoG and HFC systems can concurrently operate out of the same headend/hub, making RFoG a good solution for node-splitting and capacity increases on an existing network. Embodiments are described herein that are compatible with standards-based RFoG and PON systems, but it should be understood that other upstream and downstream wavelengths may be compatible with the disclosed techniques.

RFoG allows service providers to continue to leverage traditional HFC equipment and back-office applications with the new FTTP deployments. For example, cable operators can continue to rely on the existing provision and billing systems, Cable modem termination system (CMTS) platforms, headend equipment, set-top boxes, conditional access technology and cable modems while gaining benefits inherent with RFoG and FTTx.

FIG. 1 shows an exemplary RFoG system 10, where a head end 12 delivers content to an ONU 14 at a customer's premises through a node 16. An RFoG topology includes an all-fiber service from the headend 12 to a field node or optical network unit (ONU), which is typically located at or near the user's premises. In the headend 12, a downstream laser sends a broadcast signal that is optically split multiple times. The optical network unit 14, or ONU, recovers the RF broadcast signal and passes it into the subscriber's network, which may be coaxial or also upgraded with fiber communication.

The head end 12 may include a transmitter 18 that delivers a downstream signal to one or more 1×32 passive splitters 20 that includes 32 output ports, each output port connected to a wavelength division multiplexer (WDM) splitter 28 that delivers the downstream content over a fiber transmission segment 24 to the node 16. The node 16 may include another 1×32 splitter 22, where each output port of the splitter 22 is connected via another fiber segment 26 to a particular ONU 14 at a subscriber's premises.

Optical networking units (ONUs) in an RFoG environment may terminate the fiber connection at a subscriber-side interface and convert traffic for delivery over the in-home network at the customer premises. Coaxial cable can be used to connect the ONUs of an RFoG network to one or more user device, wherein the RFoG user devices can include cable modems, EMTAs, or set-top boxes, as with the user devices of an HFC network. For example, an R-ONU may connect to set-top boxes, cable modems, or like network elements via coaxial cable, and one or more of the cable modems may connect to the subscriber's internal telephone wiring and/or to personal computers or like devices via Ethernet or Wi-Fi connections.

Those of ordinary skill in the art will appreciate that the foregoing architecture is illustrative only. For example, the number of ports of the splitters 20 and 22 may be changed, as desired. It should also be understood that the head end 12 may include more splitters 20, each splitter having outputs connected to a respective node so as to serve a great number of subscribers.

Along the return path from the subscriber's ONU 14 to the head end, the splitter 22 operates as a combiner, i.e. for a 1×32 port splitter/combiner 22, up to 32 ONUs may deliver return path signals to the node 16, which combines them for upstream transmission along fiber length 24. Each of the signals from the respective ONU's 14 is then separated from other signals by the WDM 28 to be received by a separate receiver 30 in the head end 12. The signals from the respective receivers are then combined by a combiner 32 for transmission to a Cable Modem Termination Service (CMTS) in the head end 12. The signals are combined in the RF domain in the headend 12 by the combiner 32, before being connected to the CMTS upstream port. Combined with the forward power limit on the fiber, the combined signals may require one forward fiber 24 (L1 km) per group of 32 subscribers.

In the forward direction, the forward transmitter is provided to a higher power multi-port amplifier that distributes power. For example, in the head end 12, the transmitter 18 provides output to an Erbium Doped Fiber Amplifier (EDFA) 34 that internally distributes power over the 32 outputs of the combiner 20, each output operated at a relatively high power, e.g. approximately 18 decibel-milliwatts (dBm). The WDM 28 may transmit 1550 nm light from the EDFA 34 in the forward direction and direct reverse light, typically at 1610 nm or perhaps 1310 nm in the reverse direction to the receivers 30. The WDM 28 may be connected to a fiber of length L1 that feeds the splitter 22 in the node 16.

The outputs of the splitter 22 may each be provided to second fibers of length L2 that are respectively connected to ONUs 14 at the subscriber homes. In embodiments, L1+L2 may be up to 25 km. The ONUs 14 convert the forward transmitted light to RF signals for the in-home coaxial network. In the return direction, the ONUs 14 may also receive RF signals from the in-home network and modulate these signals onto a laser, operating at 1610 nm for example, and the laser's output is sent upstream into the fiber L2. The upstream signal may be combined with other upstream signals in the combiner 22 and transmitted further upstream in the fiber L1. At the WDM 28 the upstream signals are directed towards the head end receivers 30.

The loss budget for 32 subscribers and 25 km of fiber requires one receiver in the head end 12 for every group of 32 subscribers; given an upstream transmission power of 3 dBm, the receivers 30 and the WDM 28 may typically operate at a power between −18 and −21 dBm, making a good signal to noise ratio challenging, such that band limited receivers are usually required for acceptable performance. Furthermore, the optical combiner 22 may be passive and combine multiple optical inputs to a single output. Thus, by definition the optical combiner 22 may create OBI between these inputs, as described earlier and will therefore create noise in the RF domain at the head end receivers 30. Furthermore, assume a loss of around 24 dB in the forward path; for an EDFA output power of 18 dBm per port this provides −6 dBm power to the receivers. This is sufficient for acceptable performance at the ONU to 1 GHz, provided low noise high gain receivers are used.

In case the 32 subscribers can be received individually at the star splitter location then the input power to the receiver is high, almost as high as the return laser power since the links to the star splitter are short. A high SNR is readily obtained and there is no OBI. The combined signal of all received signals must then be re-transmitted over the long (25 km) fiber link and detected at the headend. At the headend multiple such return links need to be combined so a similar multiple input receiver design could be used. The multiple input receivers may be designed such that the thermal noise figure does not depend on how many inputs are used such that combining of multiple sources is straightforward. However the thermal noise figure is higher than that of a regular receiver. This may be overcome by the higher receiver levels.

From a splitter that distributes light to subscribers and combines return light from the subscribers at a penalty, there can be a long link (e.g., up to 25 km with an additional 6 dB of loss) back to a headend or hub where the combined return sources are detected at a receiver. The total loss is high such that the receiver SNR is degraded. Furthermore, typically up to 8 receiver outputs are combined onto on CMTS return port that thus handles around 256 subscribers. In this combining, the receiver thermal noise adds up and unless means are implemented on the receivers to turn them off in the absence of signal the SNR is degraded by a further 9 dB. With such means the SNR is still degraded by up to 6 dB when up to 4 return transmitters are on simultaneously, a valid operation mode of the return network.

In embodiments, an active optical splitter with a splitter and wavelength selective components directs upstream light from output fibers at at least one wavelength band to a multitude of detectors in the transmission line structure, and passes downstream light to and upstream light of other wavelengths from the output fibers and at least one upstream transmitter The phenomenon of optical beat interference (OBI) may occur in RFoG systems when two return transmitters hit a receiver simultaneously on the same wavelength. In a cable system, for example, the condition that cause OBI can easily occur in multiple-dwelling unit (MDU) applications of DOCSIS-based systems with bonded upstream channels. Optical Beat Interference (OBI) can occur, which is a signal degradation that occurs when two or more lasers with closely-spaced optical frequencies transmit simultaneously from two ONUs.

Figure 2:
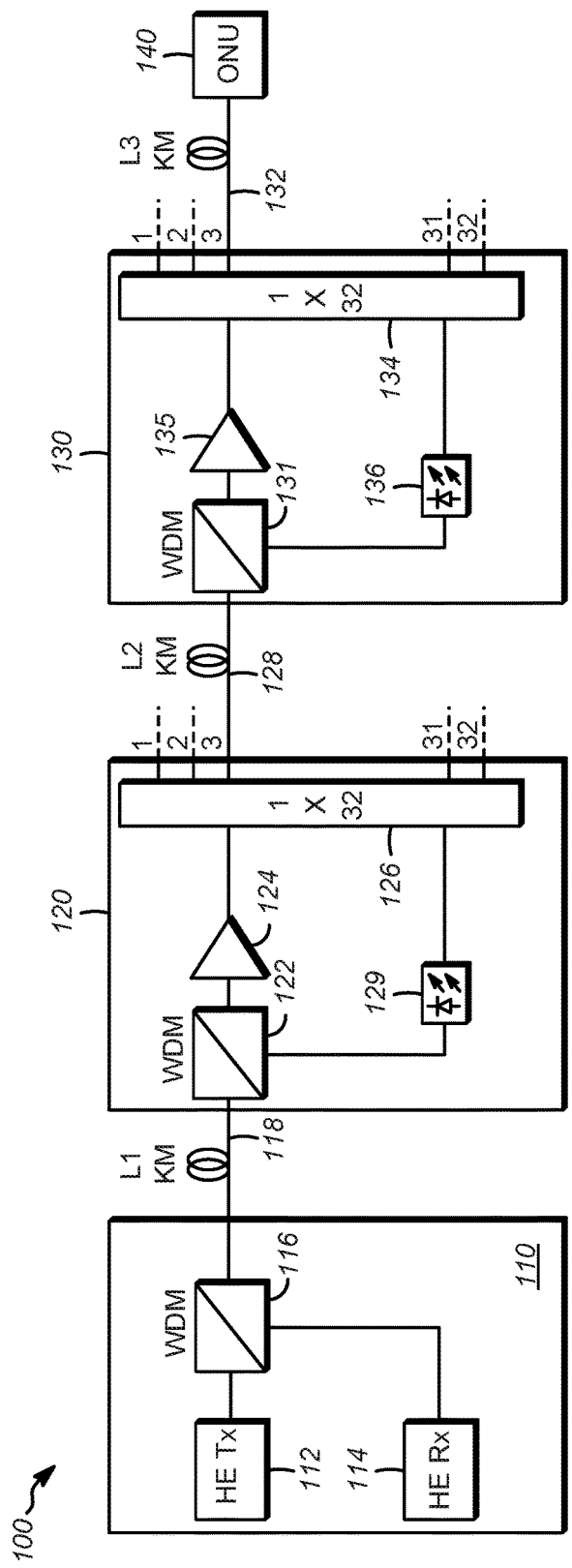
FIG. 2 shows an RFoG architecture improved in accordance with the disclosed techniques.

FIG. 2 shows an improved system 100 for delivering content, e.g., CATV content, to a plurality of subscribers over a network, such as the RFoG network described above. The architecture includes a head end 110 having a transmitter 112 and receiver 114, each connected to a WDM splitter 116 that outputs a signal to, and receives a signal from, a fiber link 118 of L1 km. The fiber link 118 is connected to an active splitter/combiner unit 120. The splitter/combiner unit 120 may include a WDM 122 that may separate forward path signals from reverse path signals. The forward path signal from the WDM 122 is provided to an EDFA 124 that outputs an amplified optical signal to an active 1×32 splitter 126 that has 32 output ports communicable to respective second fiber links 128. At each port, the power level is modest, in the 0-10 dBm range.

In the reverse direction, the 1×32 port splitter 126 operates as an active combiner 126, and includes, at each port, a WDM that directs upstream light to a detector at the port, which converts received optical signals to electrical signals, amplifies them in the RF domain, and provides the electrical signals to a transmitter 129 that outputs light at, for example, 1610 nm, 1310 nm, or some other appropriate wavelength, provided to the WDM 122, which in turn directs the upstream light into fiber 118. At the head end, the fiber 118 is connected to WDM 116 that directs the upstream light to the receiver 114.

Each of the 32 ports of the splitter/combiner 126 outputs, through a respective fiber 128, a respective signal to a second active splitter/combiner unit 130, which may be of the same type and configuration as the splitter/combiner unit 120. The length(s) of the fiber 128 may vary with respect to each other. The output power per splitter port is low, around 0 dBm. The splitter ports are connected to ONUs 140, for instance in a Multiple Dwelling Unit (MDU) or a neighborhood, via fiber 132 of length L3. In a basic RFoG system, the sum of the fiber lengths L1+L2+L3 is up to 25 km. The system 100, however, will permit a higher total length of fiber between the head end and the ONUs, such as 40 km, because the system 100 can tolerate a higher SNR loss, as further described below.

The upstream signals from the ONU 140 may be individually terminated directly at the active splitter/combiner unit 130. Even for ONUs operating at 0 dBm, the power reaching the detectors is around −2 dBm (the fiber 132 is a short fiber up to a few km, and the WDM loss inside the active combiner is small). This is almost 20 dB higher than in existing RFoG systems, meaning that the RF levels after the detector in the splitter 134 is almost 40 dB higher than in existing RFoG systems. As a consequence, the receiver noise figure is not critical and high bandwidth receivers can be used with relatively poor noise performance. The received RF signal is re-transmitted via the transmitter 136 along the reverse path into fiber 128 and received and retransmitted by the preceding active splitter/combiner unit 120 and thereafter to the head end 110.

Figure 3A:
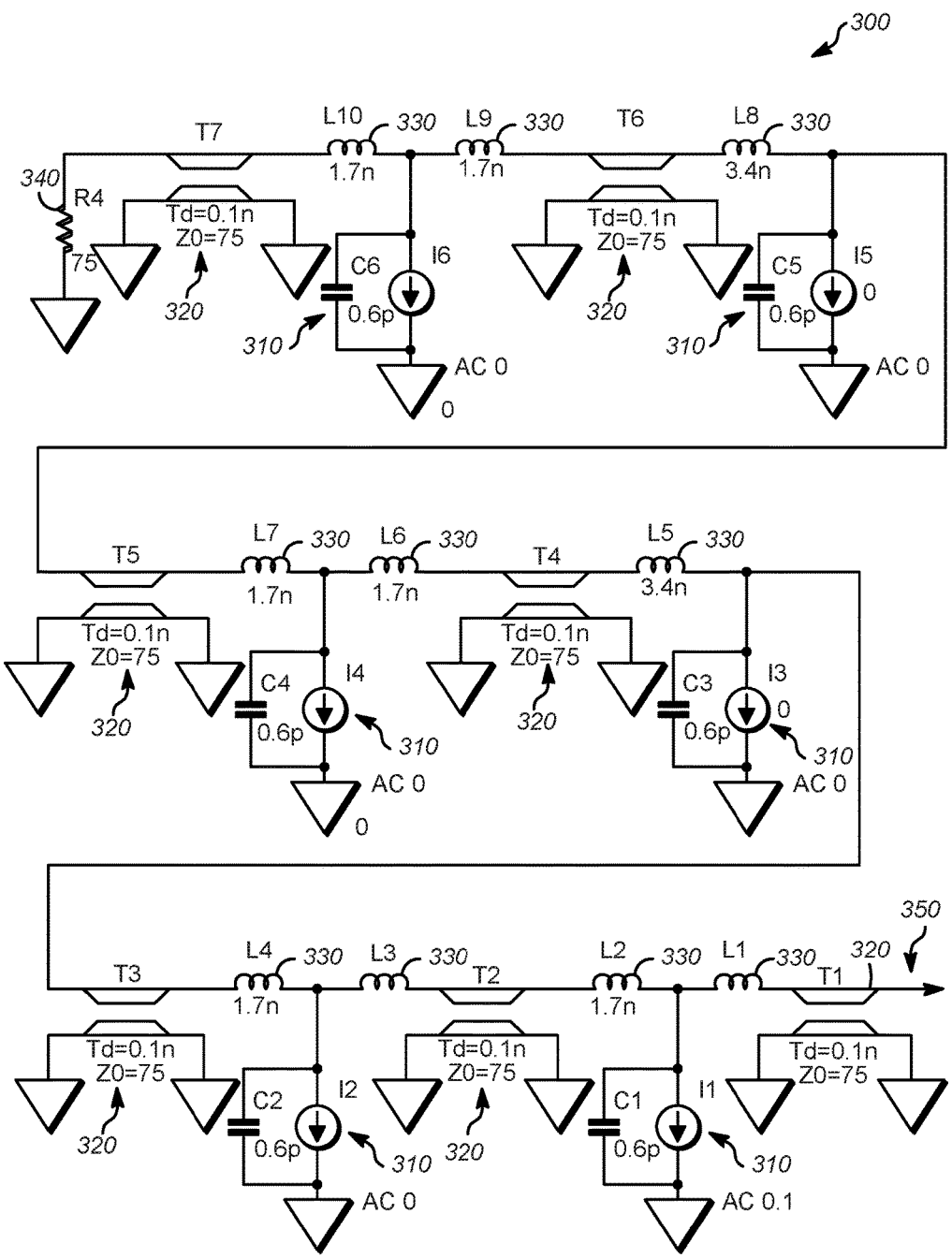
FIG. 3A illustrates an example of a transmission line receiver structure.

Although the repeated re-transmission may lead to some incremental reduction in SNR, improvements in SNR from the active architecture provides much greater overall performance relative to traditional RFoG systems. More importantly, because all reverse signals may be individually terminated at separate detectors, such as a multiple detector receivers inside upstream active receiver 126 and 134 in the transmission line detector structure, there can be no optical beat interference (OBI) between different reverse signals. Referring ahead to FIG. 3A, multiple detectors are depicted as a current source and capacitor in parallel.

In FIG. 2, the lasers 129, and 136 are reverse transmitting lasers. For instance, active receiver 134 in FIG. 2 is a unit with multiple photodetectors, and FIG. 3A depicts the inner workings of how multiple detectors may be connected. The reverse signals are not combined optically, i.e., the reverse signals are individually detected and electrically summed in RF signals put out to reverse transmitting lasers 129 and 136, hence OBI cannot occur.

In the forward direction there may be multiple EDFAs, e.g., 124, 135. The EDFA may amplify the forward signal such that a high split ratio following the EDFA can be tolerated while still providing sufficient power to the next stage and/or end-users. For example, the active combiner with the transmission line structure disclosed herein offers such a good performance that the split ratio can be very high, so high that amplification of the forward signal becomes necessary. These EDFAs may be cost effective single stage devices with low power dissipation—typically 2 Watts or less. Cascading the EDFAs result in an accumulation of noise due to the finite noise figures of the EDFAs. Whereas the active splitter architecture does not require the EDFAs (the high power head end EDFA (not shown, but may be inserted after transmitter 112) could still be used to provide power to the ONUs 140) the use of EDFAs 124, 135 inside the active splitter units provides some advantages. For example, the complexity and power dissipation of equipment in the head end 110 is greatly reduced, as is the fiber count emanating from the head end 110. The amount of power delivered to the ONUs 140 is readily increased to approximately 0 dBm. As a consequence, ONU receivers obtain 12 dB more RF level from their detectors and do not need as high an SNR or gain. Even with relaxed SNR requirements at the ONU receivers, the SNR impact due to EDFA noise is easily overcome due to the higher received power. In addition, more spectrum can be supported in the forward direction with an acceptable SNR relative to current architectures, such as 4 GHz instead of 1 GHz in current RFoG. Hence total data throughput rates can grow significantly without a change in operation to permit for example, services that provide 40 Gbps download speeds and 10 Gbps upload speeds.

Embodiments for an RFoG combiner include preventing or eliminating OBI at the combiner as opposed to managing it at the extremities of the network (such as using a CMTS scheduler at the headend side of the network or wavelength specific ONUs at the subscriber end of the network). Embodiments are described that enable elimination of OBI. The disclosed optical combiner may be used to eliminate OBI, enhance capacity, and/or enable multiple services in RFoG, the cable version of FTTH networks.

Techniques for eliminating OBI, such as those described herein, are desirable, and may enable higher capacity in the upstream and downstream. For example, the optical combiner may enable OBI free and high capacity features by deployment in compatible HFC D3.1 capable FTTH networks. Likewise, the optical combiner may be incorporated in to GPON, 1G-EPON, XGPON1, 10G/1G-EPON, 10G/10G-EPON. The compatibility with HFC and D3.1 enables the disclosed optical combiner to be deployed alongside a current HFC network, and is D3.1 ready. The optical combiner may be deployed on a fiber node, on multiple dwelling unit (MDU) and on single family home (SFU) deployments.

The disclosed combiner and features of the combiner may enable RFoG coexistence alongside traditional HFC/D3.1 systems and future potential PON systems. The elimination of OBI is critical in some systems to unlock the vast potential of the optical fiber. The disclosed optical combiner may eliminate OBI, making a fundamentally OBI-free system. The optical combiner enables long reach and large splits, e.g., Up to 40 km and 1024 Splits, which will expand even further. The high upstream and downstream capacity enabled by the disclosed optical combiner includes up to 10G DS/1G US, and as high as 40G DS/10G US. In embodiments, the disclosed optical combiner prevents interference in RFOG deployments in the combiner, rather than preventing interference by measures taken in the ONU where previous attempts have failed or proven to be cost prohibitive.

The disclosed optical combiner may be independent of ONUs, Cable Modems and CMTSs. The disclosed optical combiner may be CMTS agnostic, thus relieving the burden of creating an RFoG aware scheduler that is both restrictive and time consuming. The optical combiner assists to make a cable version of FTTH more feasible, as compared to the PON alternatives. For example, in embodiments, the disclosed optical combiner has a reciprocal PON Pass thru capability of the optical combiner along with a high upstream and downstream capacity, which assists RFoG deployment without interruption to the underlaid system or impairment to future inclusion of PON functionality, such as later PON deployment on an RFOG system.

Traditional RFoG and PON networks have a fixed power budget. This means that a longer reach results in lesser splits and a larger split results in shorter reach. This reach/split combination is a fundamental limit of these networks. The disclosed embodiments may enable both a longer reach and a larger Split. Thus, embodiments are described that may advance FTTH topology and make FTTH deployment feasible.

The headend optical receiver may only need an input power range from 0 . . . −3 dBm, and require 15 dB less RF output power due to the absence of the RF combiner such that with such a high optical input power and low RF output power requirement the gain can be low.

In embodiments, the optical combiner has 32 ports, but only requires one transmit port, one receive port, and one WDM component. Thus, instead of requiring 32 WDMs and 32 receive ports, the disclosed optical combiner may save on head end space and power. The combiner may be an active device that needs approximately 2 Watts of power. The optical combiner may be powered by power sources readily available in the RFoG system, or power can be provisioned in to the optical combiner. The power source may include a battery back-up or solar/fiber power alternatives. If the power is lost and the battery has also drained, the entire reciprocal PON transmission is unaffected. The upstream RFoG transmission is however stopped. In a conventional RFoG system it would have been stopped also because the preponderance of OBI would have severely impaired the system anyway if the system was a traditional RFoG system with a passive combiner.

Also in case of a power loss ONU (Optical Networking Unit) at the homes would cease to function such that without any power backup such systems will cease to function, whether those are RFoG or PON systems, with or without the active combiner disclosed here.

The overall cost of an active splitter architecture, such as that shown in FIG. 2, is similar to that of a traditional RFoG solution. The cost of active splitter EDFA gain blocks and WDM and detector components in the active architecture is offset by the elimination of head end gear such as receivers, high power EDFAs and combiners. A cost reduction of the ONUs that can operate with lower output power further supports the active splitter architecture. Further advantages of the active splitter architecture may include a reduction in outgoing fiber count from the head end, which can have a large impact on system cost, as well as an option to use 1310 nm reverse ONUs while staying within a typical SNR loss budget, which can further reduce costs. Also, the system shown in FIG. 2 exhibits increased bandwidth relative to what existing RFOG architectures are capable of providing, avoiding limits on service group sizes and concomitant requirements for more CMTS return ports. Finally, unlike OBI mitigation techniques in existing RFoG architectures, the system shown in FIG. 2 does not require cooled or temperature controlled optics and bi-directional communication links that necessitate additional ONU intelligence.

Each of these factors provides a further cost advantage of an active splitter solution over existing RFoG architectures. Required space and power in the head end is also reduced; the active splitter solution requires one transmit port, one receive port and one WDM component. Existing RFoG architectures, on the other hand, requires transmit ports, multi-port high power EDFAs, 32 WDM's, 32 receiver ports, and a 32-port RF combiner. Existing RFoG architectures require very low noise, high gain, and output power receivers with squelch methods implemented to overcome power loss and noise addition in the RF combiner. The system 100 shown in FIG. 2, conversely, works with input power normally in the 0-3 dBm range, little gain is required, and requires 15 dB less power output due to the absence of the RF combiner before the CMTS.

Some active splitter/combiner systems may include redundancy where active optical splitters switch their return laser power (the return laser that carries the combined information of the ONUs connected to it) between a high and a low power state or operates this laser in CW mode. In that case an upstream head end or active optical splitter can easily detect loss of power at an input port and enable a second input port connected to another fiber route to receive the information, in the forward path the other fiber route would also be activated in this case because generally the forward and reverse light share the same fiber. Also, some active splitter/combiner systems may include a reverse laser in the active optical splitter that adjusts its power output as a function of the number of ONUs transmitter to the active optical splitter and the photocurrent received from these ONUs. Still other active splitter/combiner systems may have a gain factor and reverse laser power of the active optical splitter set to a fixed value.

Disclosed are embodiments for an active receiver structure that combines a large number of detectors without bandwidth penalty and provides a better SNR than conventional RFoG. In embodiments, an optical multiplexer structure is designed around the active splitter such that passive PON network operation is not impeded. In embodiments, the active receiver handles RFoG signals, not PON signals.

As described above, conventional implementations use multiple receivers that are RF combined resulting in much higher cost, more power dissipation and poorer noise performance. Optical Beat Interference (OBI) and the limited return link budget are problems in RFoG return networks (see http://www.scte.org/documents/pdf/Standards/ANSI_SCTE_174_2010.pdf for an overview of RFoG networks). In such networks typically a star splitter distributes light over 32 subscribers, the same splitter combines return light from the 32 subscribers at a penalty of 15 dB of loss. The use of multiple receivers is not designed to handle active combining of RF signals and passive PON splitting in one small unit. Also the optical combining of multiple sources at nominally the same wavelength can cause optical beat interference such that the information content can be overwhelmed by noise.

The disclosed concepts for OBI free receiver may work on systems such as that described in EP Publication number EP1235434 B1, which is incorporated herein by reference. As described in EP Publication number EP1235434 B1, a telecommunications network for cable distribution of television signals includes a two-way optical fibre network for distributing television signals to a subscriber's premises without using coaxial cable, in such a way that the transmission of CATV signals and the broadband return path are facilitated and the distortions are minimized in such a way as to improve the quality of the television image and the bandwidth accessible by each subscriber.

Most television signal networks use a system of data transmission via coaxial cables for a final distribution to the customers. HFC coaxial cable transmission issues include accumulated noise in the return path, in the disturbances entering via insufficiently screened existing coaxial cable, and in the limitation of the useful bandwidth. These problems increase with an increase in the number of users connected via modem.

EP1235434 B1 describes replacement of existing coaxial cables with a certain number of optical fibres which have the advantage of permitting a high data transmission capacity, to enable the transmission of analog and digital television signals and ensures compatibility with the radio-frequency modem-based data transmission system. The solution proposed by EP Publication number EP1235434 B1 enables the television signal to be carried by optical means to the subscriber's premises, and makes it possible to have a return path consisting entirely of optical fibre for carrying the data from the subscriber's premises, at low cost, and in such a way as to maintain flexibility with the existing type of network.

More particularly, EP Publication number EP1235434 B1 describes having a first optical fibre input for the entry of broadband optical AM television signals from the last optical node, a number N of optical fibre outputs for the transmission of the optical signals whose number depends on the number of subscribers to be connected, a number M of optical fibre inputs which connect an optical interface present at the premises of each individual subscriber to the equipment in question, an optical fibre output to which is sent the optical signal carrying the data from the premises of the individual subscribers, and a coaxial connector output to maintain the system's compatibility with conventional electrical signals. The said coaxial connector output is used if the first portion of the CATV network is of the coaxial type. In the present description and in the claims, the said equipment for external use is called a "dual broadband optoelectronic repeater".

In embodiments, the terms "head end" or "CATV head end module" or "station" denote the place and devices which transmit the broadband AM television signal optically in the optical fibre network, and in which the reception and demodulation of the sum of the optical signals arriving from the individual subscribers are carried out. Additionally, the term "outgoing path" indicates the components of the network which carry the broadband CATV signal from the station (head end) to the premises of each user, and the term "return path" indicates the components of the network which carry the data-containing signals from the premises of the individual subscribers to the station (head end).

The first optical fibre input is terminated with an optoelectronic receiver which can convert the broadband AM CATV optical signals to electrical signals. The electrical signals produced in this way are amplified. The amplified electrical signals are then divided by an RF splitter and sent to N laser sources. The N laser sources are supplied independently via an output optical power control circuit. A CPU connected to the output optical power control circuit enables the N laser sources to be switched off and on remotely, thus permitting the simple remote disconnection and connection of each subscriber. The N laser sources implement a conversion of the received electrical signal to an optical signal and send it, via N optical fibre outputs, directly to each subscriber. The equipment for external use has another M optical fibre inputs, which carry the return path signal from the individual subscribers, which is converted to an electrical signal by an array of M optoelectronic receivers. The M optoelectronic receivers are also switched on and off independently and remotely by the said CPU.

An RF combiner adds together the M electrical signals produced by the said M optoelectronic receivers and sends the resulting sum to an amplifier. The amplifier is connected to a switch that can switch the sum to a separating filter or to a laser transmitter for the return path. The laser transmitter for the return path converts the said sum to an optical signal and transmits it by optical fibre to the station. The separating filter is connected to the said output by a coaxial connector. The dual broadband optoelectronic repeater in question makes it possible to use the whole signal band provided by an optical fibre but only to the extent that this bandwidth is supported by the optoelectronic receivers and laser transmitters, and therefore has the advantage of permitting the frequency allocation of the carrier signals in the frequency ranges where non-linear phenomena have less effect, thus providing an improvement in the non-linearity of the system in both the outgoing path and the return path. Moreover, because of the large bandwidth of the optical fibre, it enables the flatness of the channel level to be maintained throughout the band, without the need for further equalization systems, thus providing a uniform quality of the television image in all channels. A further advantage of the invention is that, as well as providing the individual subscriber with access to the whole available bandwidth of the optical fibre for data transfer, it makes it possible to use a network topology of the point-to-point type in which the individual subscriber has a dedicated optical fibre channel, without branches between the socket installed at his premises and the final optical transmitter or receiver in the dual broadband optoelectronic repeater. This topology is suitable for the use of numerous protocols at the transport level and is flexible and robust in terms of security. The point-to-point topology also allows simple remote disconnection of each subscriber according to the requirements of the network controller. Finally, particular mention should be made of the absence of costly additional passive optical components such as optical isolators, filters and amplifiers; the compatibility with coaxial cable networks; and the intrinsic immunity of the optical fibre to electromagnetic disturbances.

The aforementioned patent suffers from a number of limitations; some of these are discussed next. For each optical input an optoelectronic receiver is used resulting in additional component cost, dissipation and noise accumulation from the active receivers. Alternately, multiple optical inputs are aggregated to one photo detector with a larger area. This results in an increased detector capacitance which in turn limits the attainable bandwidth of a receiver such that the number of optical inputs to such a detector is limited. In the forward path receiving, amplifying and retransmission of forward signals with one laser per subscriber adds considerable cost and power dissipation and the laser transmitters are bandwidth limited compared to the real optical bandwidth available from the fiber. Disclosed are embodiments for implementing in the optical combiner unit a transmission line approach to combine multiple optical photodetectors in a single optical receiver. This may be accomplished in unidirectional or bidirectional configurations. A unidirectional system provides no control communication signals from an active optical splitter to an ONU, i.e. control communication signals only pass from an ONU to an active splitter. Thus, in a unidirectional system, an active optical splitter simply accepts an output level from an ONU and operates with that output level. A bidirectional system passes control signals from an active optical splitter to ONUs instructing them to adjust their output power; this type of system permits accurate equalization of the input levels to the active optical splitter from each ONU.

A new input receiver concept is proposed to overcome these limitations of multiple optical input receiver concepts. This receiver concept suffers from a thermal noise performance that is typically worse than that of individual receivers and this would normally be considered unattractive but system performance analysis shows that the contribution of receiver noise to overall system performance is small and the overall system performance is greatly enhanced. As a benefit this receiver type provides very large RF bandwidth even when a very large number of photo-detector is used. This new receiver concept is preferably used with a passive spit for forward signals. The receiver concept enables connection of a very large number of subscribers to a single multiple detector transmission line receiver so that the forward split ratio can become very high; to overcome splitter loss a combination of the new receiver concept with optical amplification in the forward direction is proposed that avoids the complexity of OEO conversion in the forward direction.

Disclosed is a method to detect optical light over a wide input power range while retaining a constant bias on the detectors present in a newly disclosed transmission line receiver. In order to accomplish this, a combination of both an RF amplifier and a trans-impedance amplifier are used with the multiple detector structure. In some embodiments, the trans-impedance amplifier is connected to a high-pass structure in front of the RF amplifier such that for low frequencies the trans-impedance amplifier has a very low impedance connection (less than the transmission line impedance) to the detector bias.

Referring to FIG. 3A, which shows an example of a transmission line receiver structure 300, a photo-detector may be accurately modeled up to fairly high frequencies (~1 GHz) by a capacitance in parallel with a current source for reasonable input power levels (>1 uW). Thus, in this figure, each of the circuit elements 310 would be a model of a photodetector. Conventional receiver designs use a trans-impedance amplifier or match the detector to as high an impedance as possible, such as 300 Ohm, so as to convert the current source signal to an RF signal with the best possible noise performance. Such approaches are limited by the detector capacitance such that an increase in the number of detectors by simply combining detectors or by using a large detector with a large detector area leads to a loss of detector performance due to the increase in capacitance, and therefore a large number of combined detectors (e.g. 32) cannot reasonably be expected to work well with a single RF amplifier. This implies that multiple amplifiers are needed to receive a large number of fibers.

As an alternate multiple detectors could be provided to an RF combiner before being amplified; an RF combiner requires each detector to be terminated individually with an RF impedance that is typically less than 100 Ohm that will consume half of the detector current and introduces an additional loss due to combining of at least 10*log(N) dB where N is the number of detectors combined. This loss is excessive for 8 detectors or more. Further, additional losses are caused by practical implementations of RF combiners that require expensive transformers in their realization. The transformers also cause bandwidth limitations and aforementioned additional losses and are difficult to implement for high impedances (such as greater than 100 Ohm).

In the disclosed transmission line receiver use is made of the insight that a reverse biased photo-detector behaves as a current source in parallel with a capacitor with a low loss at RF frequencies. This transmission line receiver will not induce the 10*log(N) loss of the RF combiner, not require transformers, offer a high bandwidth and be able to provide an output signal representative of a delayed sum of a large number of detectors. A transmission line with impedance Z can be modeled by a ladder network of inductors and capacitors with L/C=Z^2, which works well for frequencies under the resonance frequency of L and C. Practical detector capacitance values are on the order of 0.6 pF, such that a 75 Ohm transmission line would require L=3.4 nH. The resonance frequency is well over 1 GHz such that, for up to 1 GHz, a transmission line with an arbitrary number of detectors compensated with 3.4 nH inductors would simulate a 75 Ohm transmission line. The quality of the parasitic capacitance of the reverse biased detectors is such that they can be considered low loss capacitors at RF frequencies. The 3.4 nH can also be distributed around the detectors as 2×1.7 nH, leading to a design as shown in FIG. 3A.

As indicated above, each current source/capacitor combination 310 represents a detector. FIG. 3A shows a number of these in series, separated by respective transmission line sections 320 (100 psec or on the order of 1 cm on board) having 75 Ohm impedance. The detectors are matched with 1.7 nH inductors 330. A 75 Ohm resistor 340 terminates the input of the transmission line. The output 350 of the transmission line feeds a low noise 75 Ohm RF amplifier (not shown). It should be understood that, although FIG. 3A shows six detectors, there is no limit on the number of detectors that can be combined by concatenating these sections, and up to the LC resonance frequency there is negligible impact on the attainable bandwidth for a large number of detectors. In practice the 1.7 nH inductors could be implemented in the PCB layout as narrower line sections, and a balanced transmission line with 100 Ohm or 150 Ohm differential impedance may be used to slightly improve noise figure.

As shown in FIG. 3A, each current source/capacitor combination 310 represents a photo detector, where the current source is the detected current in the detector; and the capacitor represents the parasitic capacitance of the detector. Multiple detectors are connected with sections of transmission line (such as C2) and matching inductors (such as L2 and L3). The matching inductors are chosen such that the parasitic capacitance of the photo detectors is matched to the transmission line impedance (typically 75 Ohm). Thus multiple detectors can be connected and concatenated to a transmission line, such that the detector currents are provided to the transmission line and these detector currents are equally divided to propagate both to the output 350 and to the termination resistor 340 at the other end of the transmission line structure. Each detector current generally passes through transmission line sections, matching inductors and detector terminals before reaching an end of the transmission line. Thus signals from adjacent detectors affect the signal voltages present at each detector terminal and could thus affect the detector current itself causing a cross-modulation of detector signals.

However, because a detector at reverse bias can be modeled as a good current source such a cross-modulation does not occur. Each detector current half is thus presented at the output of the transmission line 350 as a signal with a delay proportional to the distance of the detector to the output of the transmission line. This distance determines the delay of an electrical signal at the terminal of the detector to the output of the transmission line and includes delay due to matching inductors and photo-detector capacitance. The signal at the output of the transmission line thus is proportional to the sum of the delayed detector current halves, independent of the number of detectors in the transmission line structure. The signal at the output of the transmission line can thus be said to represent the sum of the delayed detector currents.

It should also be noted that since the detectors are arranged in a transmission line structure that is terminated on one side with a termination resistor 340 and at the output 350 with an amplifier multiple such transmission line structures can be concatenated because the output impedance of a transmission line receiver as seen at the output 350 is equal to transmission line impedance and that impedance was chosen to be equal to that of the termination resistor 340. Thus, instead of a termination resistor 340 an entire transmission line receiver could be connected to the input of the transmission line receiver without penalty. For instance a first transmission line receiver (a) may have a termination 340a and an output 350a and a second transmission line receiver (b) may have a termination resistor 340b removed and instead be connected to the output 350a of the first transmission line receiver 350a. The output of the second transmission line receiver presents the summed, delayed photodetector signals of both transmission line receivers and may be connected to an amplifier or to a further transmission line receiver.

The transmission line structure bandwidth is limited only by the inductive matching of the photo-diode capacitance and can be very large, exceeding 1 GHz. The output 350 is connected to an RF amplifier matched to the transmission line impedance. which amplifies the signals output from the transmission line structure. Note that use of a trans-impedance amplifier that is not matched to the transmission line structure would cause a very large reflection of the output signals back into the transmission line structure; a trans-impedance amplifier is not a preferable means to amplify the output from a transmission line receiver.

Typically the photo detectors need to be biased, for instance with 5 V. In order to decouple the bias voltage from the amplifier, a decoupling capacitor may typically be used. The bias can then be provided via an inductor in a bias-tee arrangement. For example, the signal from the transmission line 360 may be provided to an amplifier via a capacitor 370 that passes high frequency signals, and bias from a voltage source 375 may be provided to the transmission line via an inductor 380 that passes low frequency signals. The termination resistor 340 at the other end of the transmission line may preferably be capacitively decoupled to permit a DC bias. The current through voltage source 375 can be measured to determine photocurrent; the voltage source 375 could be constructed as a trans-impedance amplifier providing a constant voltage and an output proportional to the current provided.

In embodiments, an RF combiner can be used for multiple detectors. Embodiments for the configuring the receiver as a transmission line receiver configured for combining a large number of optical detectors into a single RF signal may be accomplished as disclosed without a bandwidth penalty. The combination of multiple optical detectors combined into a single RF signal may result in a slightly modest penalty in noise performance, but result in an SNR that is much better than in traditional optical combining followed by a single detector.

An RF combiner used for multiple detectors may have a minimum loss of $10*\log(N)$ dB where N is the number of detectors. For a large numbers of detectors the combiner loss may be significant. While active combiners can be used to overcome this combiner loss, such combiners have a degraded noise performance due to the use of multiple RF amplifiers in such a combiner and the typical need for a large number of amplifiers.

As disclosed herein, detectors in a transmission line may be included, where the transmission line is matched to the detector capacitance, for instance using inductive compensation. This structure has a fixed loss of 3 dB in signal power due to the termination on one side of the transmission line, independent of the number of detectors in the transmission line. The other end of the transmission line is provided to a single amplifier. Such a receiver that includes a transmission line provided to a single amplifier is also referred to herein as an active multiple detector transmission line receiver, multi-detector receiver or as an active receiver.

As introduced above, the disclosed active receiver supports OBI free technology. OBI free is a technology that provides the fiber transport of DOCIS 3.1 signals completely free of optical beat interference (OBI). Combining upstream paths using an active multiple RF combiner, or preferably using an active multiple detector transmission line receiver instead of an optical splitter, enables a combined or direct connection of subscribers. With an active multiple detector transmission line receiver, the optical budget determination is more accurate since optical losses from the optical splitter are eliminated.

Figure 3B:
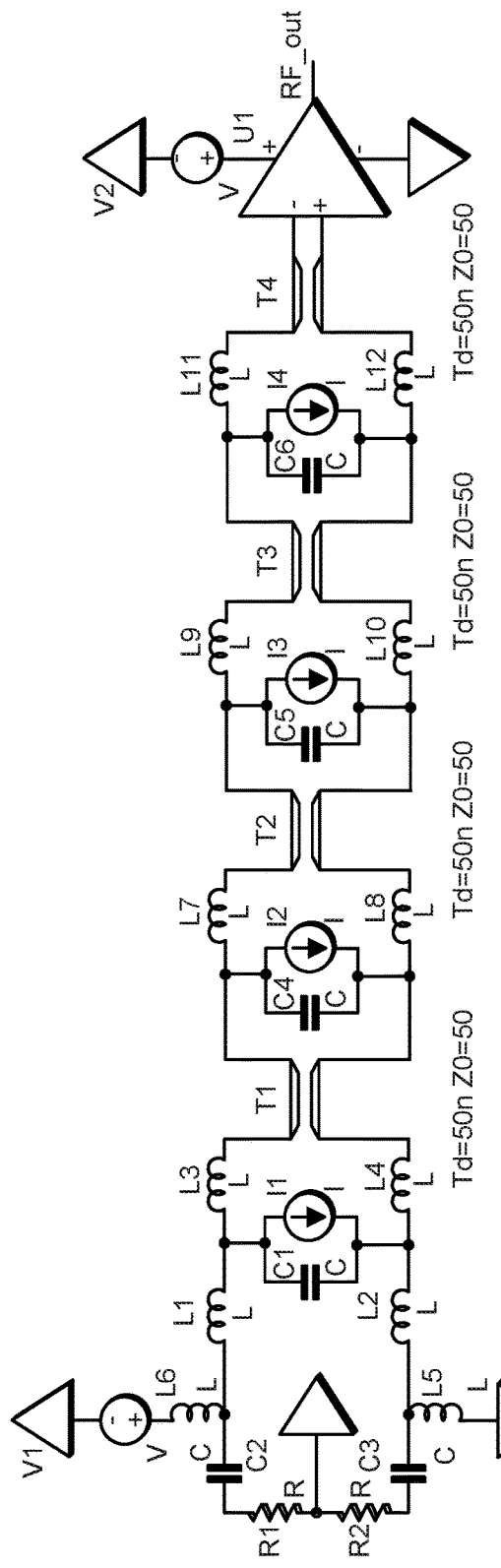
FIG. 3B illustrates another embodiment for the transmission line receiver structure, implemented in a differential transmission line

FIG. 3B illustrates another embodiment for the transmission line receiver structure, implemented in a differential transmission line. As shown in FIG. 3B, a differential amplifier U1 with a supply voltage V2 is driven at + and − inputs from a differential transmission line section T4, receiving signals from inductive matching elements L11 and L12. The inductive matching elements L11 and L12 are connected to elements C6/I4, which are representative of a photodetector adding a signal current to the differential transmission line structure with opposite polarity at the nodes to L11 and L12, respectively.

The transmission line structure continues to transmission line section T3, matching inductors L9, L10, detector C5/I3, transmission line section T2, matching inductors L7/L8, detector C4/I2, transmission line section T1, matching inductors L3/L4, detector C1/I1 and finally matching inductors L1 and L2. These elements are connected to decoupling capacitors C2, C3 that are connected to RF termination resistors R1 and R2. RF termination resistors R1 and R2 have an impedance chosen equal to that of the transmission line. Inductors L5, L6 can be used to provide a bias voltage to the detectors using a voltage source V1.

It should be noted that the detector C1/I1 has 4 inductive matching elements whereas the other detectors have two inductive matching elements; this serves to illustrate that different arrangements of inductive matching elements are possible provided that the inductive matching elements match the capacitance of the photodetector to the transmission line impedance. Also shown are transmission line sections; this serves to illustrate that additional transmission line sections with an impedance equal to the transmission line impedance can be used but they need not be used. It should also be noted that filters can be placed between the transmission line output (T4) and the amplifier (U1) to perform, for instance, a high pass filter function. Such a filter, or networks connected to the bias inductors L5, L6 or termination resistors R1, R2 may provide a means for detection of photocurrent in one or more of the detectors. The number of detectors arranged in the differential transmission line receiver may vary.

The disclosed active receiver includes a fundamental elimination of OBI that is also ONU, CM, and CMTS independent. The receiver is compatible with HFC networks, PON networks, RFOG networks, full EPON, 10GEPON, and is also DOCSIS 3.1 compatible. As described in more detail below, longer reach and large splits are made possible with the disclosed receiver, including a reach of up to 40 km and 1024 splits, which can be increased depending on the implementation. The active receiver may be deployed simultaneously in nodes, MDU, and SFU deployments. In embodiments, upstream and downstream capacity increases from 10G downstream/1G upstream to 40 g downstream/10 g upstream with the disclosed active receiver. The active receiver enables a new class of high capacity FTTH architectures.

Implementation of an optical power detection circuit capable of covering a wide range of optical input power in an architecture having multiple detectors, as disclosed, is not trivial. Given the large number of detectors present, combined with a wide optical input power range, the amount and range of photocurrent that needs to be reliably detected is considerable. Simply measuring the voltage drop across a resistor in the detector bias network is difficult; at low input power on a single detector, a small voltage drop can be reliably detected only if the value of a resistor, across which is a voltage drop equal to the photodetector bias, is relatively high. However, increasing the value of such a resistor is not desirable because this leads to an increased voltage drop when high detector currents are present at multiple detectors; the detector bias would become a strong function of the optical light present at the detectors. In some embodiments, the detector bias is held constant because detector responsivity depends on detector bias; thus a varying detector bias could lead to a variation in the gain of the system. Even a resistance value as low as a typical transmission line impedance, such as 75 Ohms, can be problematic when a large number of detectors are active, and for instance 100 mA of detector current flows in the multiple detector system, leading to an excessive drop in detector bias.

As described above, detectors in a transmission line are included that are matched to the detector capacitance. Bandwidth limits for such a multi-detector receiver may exceed 1 GHz, but the thermal noise floor is higher than a conventional receiver. The disclosed multi-detector receiver may obtain same or better SNR than current RFoG systems and operate without OBI. Further, the multi-detector receiver may permit lower ONU transmit power, in some cases permitting lower ONU laser cost.

The thermal noise floor is determined by the amplifier noise figure NF (for instance 1 dB) only. The transmission line feeding the amplifier is terminated by a 75 Ohm (or 100 Ohm depending on the design) resistance that injects thermal noise. The transmission line only contains lossless components (the detectors) that do not change the noise figure so the thermal noise presented into the amplifier is the thermal noise floor of a 75 Ohm system of 7.5 pA/sqrt(Hz) (equates to −59 dBmV per 4 MHz channel bandwidth), independent of the number of detectors. When normalized to a detector equivalent current that is 15 pA/sqrt(Hz) because only half of the detector current is presented to the amplifier; each detector current is split in half such that one half is dissipated in the termination resistor. The thermal noise floor of this type of multiple detector receiver is thus given by $15*10^{(0.05*NF)}$ pA/sqrt(Hz) where NF is the noise figure of a practical amplifier following the transmission line; note only this amplifier contributes to the overall noise, this is irrespective of the number of detectors. In some cases with limited bandwidth the termination resistor can be replaced by a second amplifier and the amplifier outputs can be added in phase to improve the noise figure; this is not assumed in the analysis below.

The SNR for the disclosed multiple detector receiver system is improved compared to the conventional RFoG system. Table 1 below lists typical numbers based on the design concept described in the previous section. Plaser is the ONU laser power. The detector current is so high that the poor thermal noise floor of 21 pA/sqrt(Hz) equivalent detector current is still less than the shot and RIN noise combined and a very high link SNR is readily obtained. It is so high that a lower power ONU could be considered (e.g., 0 dBm or −3 dBm could both work). Note that the signal modulation index chosen here is somewhat arbitrary; however the same index will be used in the comparison with the conventional case.

TABLE 1

Multiple receiver + re-transmit concept

| | |
|---|---|
| Plaser | 3 dBm |
| link | 5 km max to receiver |
| Link loss | 1.5 dB |
| combiner | 1 times |
| WDM loss | 1.0 dB |
| In | 15 pA/sqrt(Hz) |
| NF amp | 3 dB |
| | 21.2 pA/sqrt(Hz) equivalent noise at detector |
| Pdet | 0.5 dBm |
| R | 0.9 A/W |
| Ipd | 1.01 mA |
| shot | 18.0 pA/sqrt(Hz) shot noise |
| RIN | −155 dB/Hz |
| | 18.0 pA/sqrt(Hz) RIN |
| Noise total | 33.1 pA/sqrt(Hz) |
| B | 6 MHz |
| Noise | 0.081 uA rms equivalent noise current on detector |
| mu | 10% effective modulation index |
| | 101.0 uA rms signal current |
| SNR | 62 dB from first link |

The analysis above is for a single active laser. As the number of active lasers increase, the SNR number, such as that shown in the table for a single laser, may degrade. With an increase in lasers, a slight additional degradation may occur. For example, if 4 lasers are active the increase in shot noise and RIN leads to up to 5 dB degradation illustrating how little the effect is due to the mediocre receiver noise figure; 6 dB degradation would have been obtained for a perfect receiver, this degradation is less for lower power return lasers.

Table 2 lists typical lists example values for an exemplary design for a multiple receiver combined with retransmission.

The multiple detector receiver concept may require re-transmission with a second optical link when used at any location other than at the same site as the RF signal demodulator, which is generally in a CMTS in the headend).

TABLE 2

Re-transmit link, assuming also of multiple RX type

| | |
|---|---|
| Plaser | 6 dBm |
| link | 25 km max to receiver |
| Link loss | 7.5 dB |
| combiner | 1 times |
| combiner loss | 1.0 dB |
| In | 15 pA/sqrt(Hz) |
| NF amp | 3 dB |
| | 21.2 pA/sqrt(Hz) equivalent noise at detector |
| Pdet | −2.5 dBm |
| R | 0.9 A/W |
| Ipd | 0.51 mA |
| shot | 12.7 pA/sqrt(Hz) shot noise |
| RIN | −155 dB/Hz |
| | 9.0 pA/sqrt(Hz) RIN |
| Noise total | 26.3 pA/sqrt(Hz) |
| B | 6 MHz |
| Noise | 0.06 uA rms equivalent noise current on detector |
| mu | 10% effective modulation index |
| | 50.6 uA rms signal current |
| SNR | 58 dB from second link |
| SNR | 56.4 dB overall SNR |

It is noted that the same multiple detector receiver concept can be used in the headend instead of the commonly-used RF combining of multiple receivers. This actually results in better performance and results in significantly lower cost, power dissipation and has a higher density. When used in the node with retransmission to the headend, the loss parameters are a little different, resulting in less detector current and a slightly lower SNR. The retransmit link therefore dominates the overall SNR.

As shown by the results in Table 2, the degradation of the SNR figure may be illustrated when 4 links into the headend receiver shot noise and RIN noise increase such that the second link SNR drops to 55 dB and overall SNR then drops by about 2.5 dB to 54 dB. Thus the system is virtually independent of the number of return transmitters that are active.

Table 3 illustrates link SNR values as computed for an example traditional headend receiver, using similar parameters for noise of the re-transmission link shown in Table 1. As shown, with these similar parameters, Table 3 illustrates that the conventional system results in a much lower receiver power than the multiple receiver and retransmission example shown in Table 1.

TABLE 3

Traditional HE receiver concept

| | |
|---|---|
| Plaser | 3 dBm |
| link | 25 km max to receiver |
| Link loss | 7.5 dB |
| combiner | 32 times |
| combiner loss | 16.1 dB |
| In | 1 pA/sqrt(Hz) |
| NF amp | 0 dB |
| | 1.0 pA/sqrt(Hz equivalent noise from pre-amp |
| Pdet | −20.6 dBm |
| R | 0.9 A/W |
| Ipd | 0.008 mA |
| shot | 1.6 pA/sqrt(Hz) shot noise |
| RIN | −155 dB/Hz |
| | 0.1 pA/sqrt(Hz) RIN |

TABLE 3-continued

Traditional HE receiver concept

| | |
|---|---|
| Noise total | 1.9 pA/sqrt(Hz) |
| B | 6 MHz |
| Noise | 0.0046 uA rms equivalent noise current on detector |
| mu | 10% effective modulation index |
| | 0.79 uA rms signal current |
| SNR | 45 dB overall SNR for a single link |

The disclosed RFoG receiver has a much better noise figure; on the order of 1 pA/sqrt(Hz) equivalent input noise can be expected. Still, as illustrated by comparing the values in Tables 1 and 3, the link SNR for the traditional headend system is much lower than that of the multiple input receiver with re-transmission shown in Table 1, the difference can exceed 10 dB.

Compared to 4 return links described with respect to Table 1, when 4 return links are simultaneously active on different traditional headend receivers (of which typically up to 8 are combined into one CMTS RF port) the SNR degrades by another 6 dB to less than 40 dB. The performance is even worse if the receivers do not have a low squelch function (that turns the receivers off when there is no input). Clearly the disclosed active receiver with retransmission illustrated in Table 1 provides far superior performance.

Table 4 illustrates an example for implementing a multiple input receiver with retransmission, where Table 4 lists example values for an amplifier and laser driver used for the retransmission. Power dissipation on the order of 1 to a few Watt is expected, it could be less with careful design. The power is so low that this may even fit in an SFP module with a coaxial input for the detector transmission line (can connect directly to a coaxial cable). This implies that the cost level could be very low. The power dissipation can also be low enough such that a reasonably sized backup battery can keep it running for a week or more.

TABLE 4

| | |
|---|---|
| 6 | dBm Rx/Tx module |
| 4.0 | mW from Tx |
| 0.15 | W/A efficiency |
| 36.5 | mA laser bias order of magnitude |
| 30% | maximum effective OMI on RTx |
| 8.0 | mA eff RF current needed on laser |
| 25 | Ohm laser match for simplicity |
| 3.0 | dBm from laser driver with 1 dB matching loss |
| 33.0 | dBm IP3 from driver for 60 dB 3rd order dist |
| 50.5 | uA rms into amplifier |
| 44.0 | dB gain needed in Rx/Tx module |
| 500 | mW driver |
| 200 | mW interstage gain block |
| 80 | mA on 3.3 V max expected front end |
| 1085 | mW dissipation |

Figure 4:
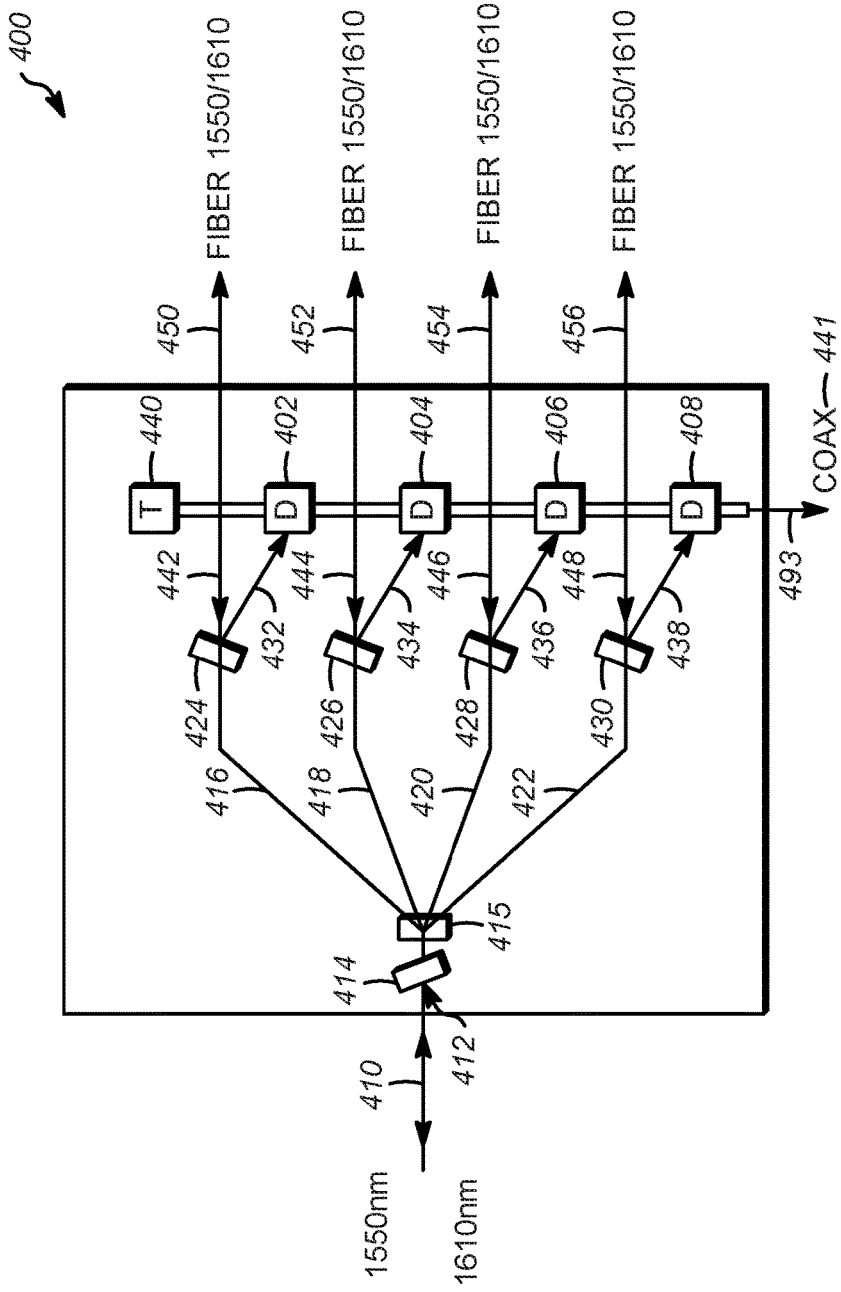
FIG. 4 illustrates integration of the disclosed transmission line receiver with wavelength division multiplexing (WDM) components

FIG. 4 illustrates integration of the disclosed transmission line receiver with wavelength division multiplexing (WDM) components 424, 426, 428, 430, with micro-optics splitting the 1610 nm light from fibers 450, 452, 454, 456 with 1550 nm light in the downstream and 1610 nm light in the upstream and directing it to detectors (D) 402, 404, 406, 408. Besides the power requirement, albeit small, a significant disadvantage of the multiple receiver concept could result if each one of the multiple return receivers requires a dedicated WDM port to separate the return light from the forward. In a conventional system one such component is needed per headend receiver. Dedicated ports for each receiver adds cost and also adds a large number of fibers and connectors that need to be handled at the nodes. This may be mitigated to some extent by building a WDM component with integrated detectors.

FIG. 4 depicts an active splitter 400 with detectors 402, 404, 406, 408 connected via a transmission line with a termination 440. Light 410 is received at the active splitter 400 from a CMTS, light 412 may be provided by a reverse laser (not shown) in the splitter 400, and the active splitter may propagate light forward over fibers 450, 452, 454, 456 to a plurality of ONUs. Light 410 may be input to the active splitter 400 from a headend as shown as light input at 1550 nm. Light 412 may be from a laser located at active splitter 400 location, the light directed towards the CMTS or other light source preceding the active splitter's WDM 414. The light enters WDM 414 and is split in a plurality of ways by a passive splitter 415, which exists at the junction of fibers 416, 418, 420, 422, to a plurality of WDMs 424, 426, 428, 430 over the fibers 416, 418, 420, 422, respectively. Outputs 450, 452, 454, and 456 from each of the WDMs 424, 426, 428, 430 may be transmitted over fibers 450, 452, 454, and 456, respectively, to a subsequent active splitter or ONUs.

The output fibers 450, 452, 454 and 456 respectively also provide upstream signals to WDMs 424, 426, 428 and 430 at a wavelength different from the downstream wavelength such as at 1610 nm so that WDMs 424, 426, 428 and 430 can selectively direct these wavelengths to detectors 402, 404, 406 and 408 connected via transmission line from termination 440 to output 493. The detectors are an integral part of the transmission line from termination 440 to output 493 as described in FIG. 4. Thus the transmission line consists of sections of transmission line with matching components including the detectors 402, 404, 406 and 408 and provides a signal representative of the sum of the delayed detector currents at output 493.

The transmission line may output signal 493 from the coaxial line 441, where output 493 represents the sum of the outputs from the detectors along the transmission line. The signal 493 may be amplified and modulated on a laser to be returned to the active splitter 400 at external 1610 nm input 412, where input 412 may be reserved for reverse laser transmitting upstream the information received from the transmission line detector structure, which is shown in more detail in FIG. 5. In particular, optical input 412 enters WDM 414 and then reflects the wavelength into fiber 410 for carrying the optical signal to the CMTS. Thus, upstream information detected by the transmission line structure that included the detectors may be relayed to the CMTS. To relay the upstream information detected by the transmission line structure, the information may be transmitted to the CMTS via 412, WDM 414 and then over fiber 410.

The other side of the transmission line may be terminated at termination 440, internal to the active splitter, or this is also brought out such that blocks, i.e., units of 440, 402, 404, 406, 408, 493 can be cascaded. For example, when cascaded then termination T (440) is removed and connected to coax output (443) of a preceding block 400, 402, 404, 406, 408, 493 two or more multiple blocks 400, 402, 404, 406, 408, 493 can be cascaded where only the first one needs a termination T (440) resulting in one output (443) that represents the delayed sum of all the photo-detector currents.

The WDM components 414, 424, 426, 428, 430 could be replaced by 10/90 splitters (90% to keep main path loss low), the resulting SNR then drops to a level comparable to a conventional system. The cost saving is TBD because the WDM implementation such as that disclosed and shown in FIG. 4 allows a drop in ONU power potentially resulting in greater savings.

Figure 5:
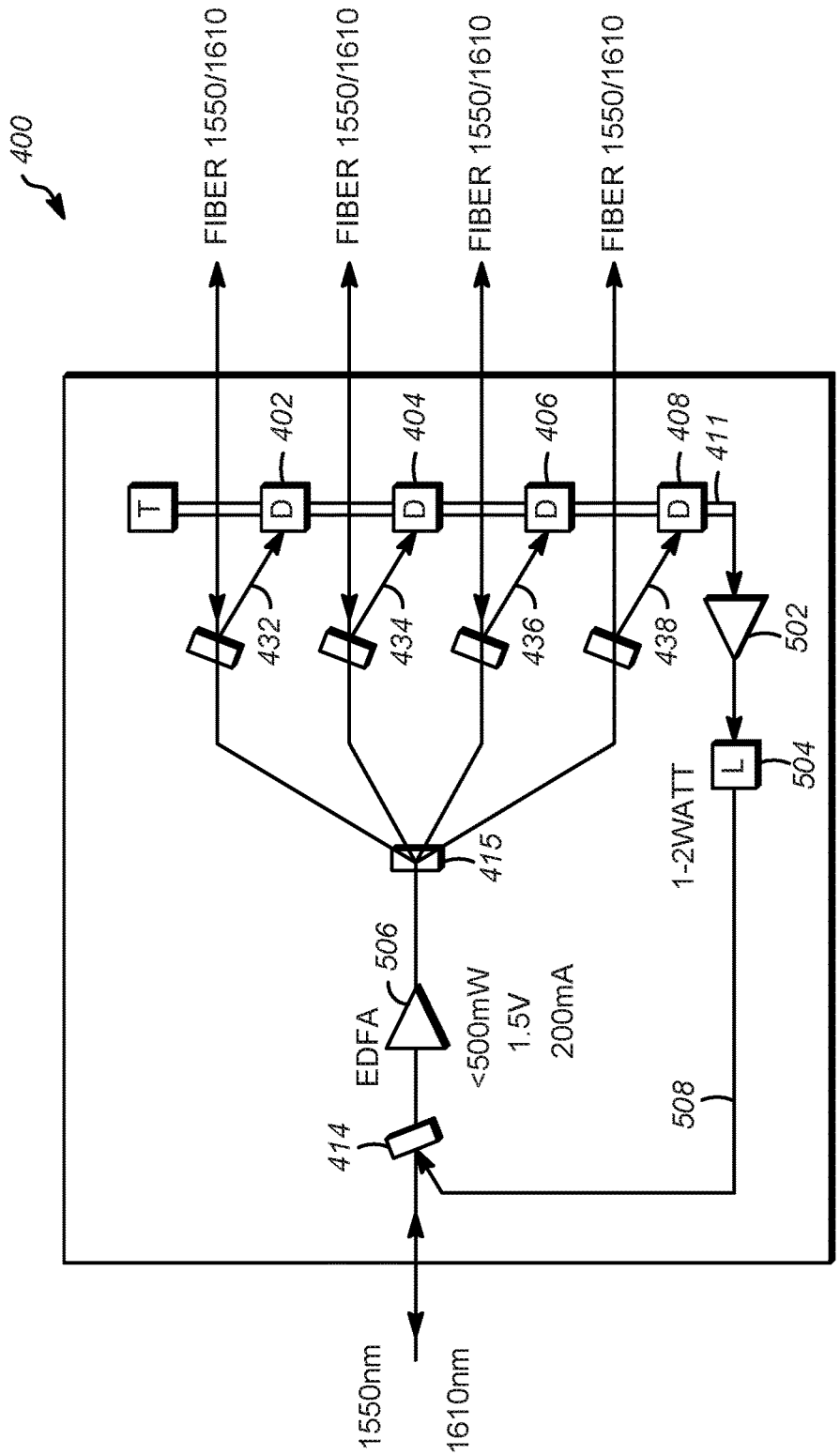
FIG. 5 depicts an EDFA added to the active splitter shown in FIG. 4

FIG. 5 depicts an EDFA added to the active splitter 400 of FIG. 4, illustrating the reverse laser 504 transmitting upstream with for example 1-2 Watt of dissipation to operate the laser 504 and for amplifier 502 driving the laser. The laser output wavelength may be 1610 nm and is coupled to a fiber supporting 1610 nm upstream and 1550 nm downstream using WDM 414.

At a headend, multiple forward transmitters may provide signals to the WDM combiner 414. The 1550 nm signals may be amplified by the EDFA 506 and distributed via splitter 415. In many cases the EDFA can operate at low power consumption, such as less than 500 mW if the EDFA includes a pump laser operating at 1.5V bias voltage and a bias current 200 mA. In disclosed configurations, the EDFA 506 may provide optical gain and dissipate in a manner that causes the passive splitter 415 to behave as an active optical splitter. Thus the active splitter/combiner 400 provides gain in both a forward direction and a reverse direction. The use of an active splitter that can dissipate at a low enough wattage to permit a small active splitter housing and still have a small temperature rise above ambient.

For example, in case a budget of up to a few Watt is reserved for a re-transmit module, a small EDFA (for instance 15 dBm) may dissipate well under one Watt. The passive splitter 415 would then become like an active optical splitter, so that active splitter/combiner 400 may be providing gain both in forward and reverse. Such an active component 400 would dissipate up to 5 Watt, low enough to allow a small active splitter/combiner 400 housing and still have a very small temperature rise above ambient.

Further, the use of an EDFA 506 does not limit the optical fiber bandwidth, enabling multi-GHz forward bandwidth operation. Apart from solar load that may need to be avoided/shielded, the EDFA component 506 does not carry the risk of extreme node temperatures that are normally dealt with, thus relaxing the requirements on the active components, laser 504, amplifier 502, and EDFA 506.

The external 1610 input 412 is reserved for a reverse laser transmitting upstream the information received from the transmission line detector structure, which is shown in more detail in FIG. 5. The port 412 of FIG. 4 has an input in to the WDM device 414, the light 508 into this port is provided by a reverse laser 504 that is a part of the active splitter 400. The WDM 414 will then reflect that light into the main path (double sided arrow for the 1550 nm downstream (left to right) and the 1610 nm returned upstream (right to left), hence the double sided arrow) in the upstream direction.

The use of an active splitter 400 as disclosed enables removal of most equipment from the HE Instead, the disclosed techniques employ a small EDFA 506 and the multiple input receiver (e.g., the receiver unit 400 in FIG. 4 or 5, including components 402, 404, 406, 408, 432, 434, 436, 438, 411, and 440) is sufficient to collect light from multiple links 450, 452, 454, 456 because the SNR is so good that low noise figure receivers are not needed. Thus, the overall performance is still better than a conventional system. Similarly in the forward direction, the active splitter may help to attain better performance margins. Various methods for powering the active splitter may be more easily implemented with the disclosed receiver. For example, a battery backup at such low power levels is easy, though a battery may need an electrical connection of some sort or a solar powered solution, for example.

As described above, the disclosed multiple input receiver concepts may provide significantly higher SNR than conventional systems and is OBI free. The number of optical inputs per receivers can be very high without affecting the receiver performance. Such a concept could require retransmission with the power requirement estimated to be on the order of a Watt or a few Watt, possibly even less with careful design. Battery backup power is an option to bridge long periods of power outage.

The disclosed multiple input receivers may be implemented in the headend, resulting in reduced cost, space and power in the headend and further performance benefits. The multiple input receiver implementation increases the SNR margins such that lower power ONUs can be considered to reduce the ONU cost. Embodiments may include implementation of one node WDM and detector per ONU, whereby the WDMs and detectors may be integrated in the splitter module that is present in the node/split location to mitigate the cost of one node WDM and deteter per ONU.

The detector signals 441 can be collected into an output 493 or otherwise impedance matched output on the splitter module 400, e.g., coaxial line is an example of a controlled impedance output, though other implementations of an impedance matched output are possible. The multiple input receiver concept permits placement of many detectors 402, 404, 406, 408 along a transmission line 440 such that the sum of the delayed detector currents is then provided to an amplifier 502 at an arbitrary distance from the detectors. In an alternative implementation, several ONUs could be combined to each detector port 402, 404, 406, 408, reducing the required number of detector ports and therefore reducing cost, with a slight decrease in SNR performance due to the insertion loss of a combiner. Thus, one could choose to use optical combiners before the detector ports, but at the risk of OBI occurring when using optical combiners. Such optical combiners would exist outside of the splitter 400.

It is noted that the use of the disclosed transmission line receiver structure is distinct from other methods that may simply use an RF combiner, as described throughout. Since the detectors are an integral part of the transmission line (there is no such thing as a combiner separate from the detectors) that does not make much sense for an RF combiner application.

In embodiments, an active splitter 400 with dissipation less than 5 Watt providing gain both in forward and reverse direction could be considered that relieves many of the design constraints of RFoG systems and reduces HE equipment space. While battery backup is easy of course it still needs some power connection.

Figure 6:
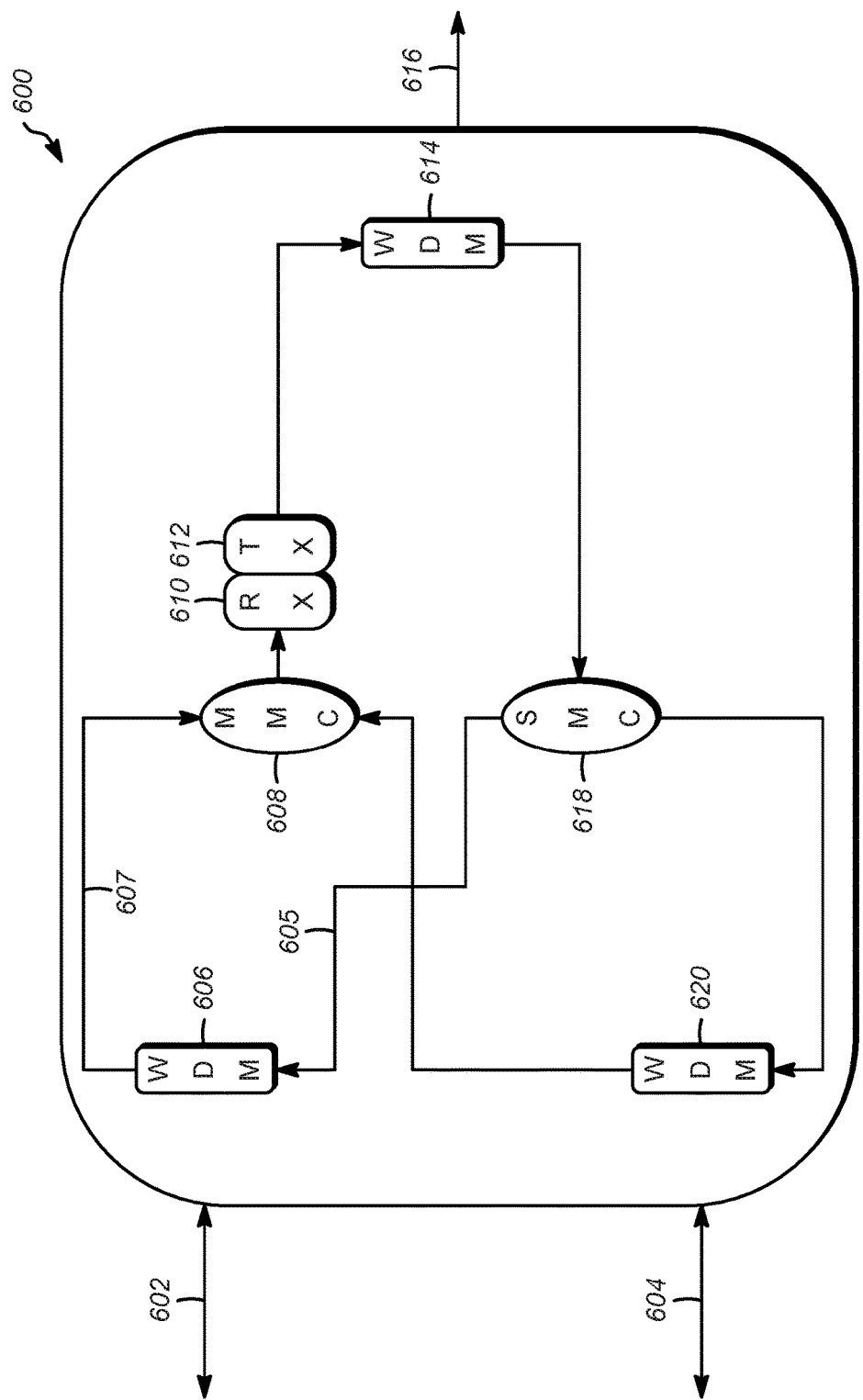
FIG. 6 depicts a multi-mode coupler (MMC) topology

FIGS. 6-12 illustrate additional topologies that may employ the disclosed techniques. FIG. 6 depicts a Multi-ModeCoupler (MMC) topology 600. FIG. 6 includes an active splitter/combiner 600 as discussed with respect to FIGS. 1 and 2. Upstream light may pass from left to right, for instance at a wavelength of 1310 or 1610 nm. Downstream light may pass from right to left, for instance at a wavelength of 1550 nm.

At the input to 600, incoming light is first separated from upstream light, for instance at a wavelength of 1310 or 1610 nm on a WDM (Wavelength Division Multiplexing) component 606. The downstream light 605 is then provided to optical components (such as thin film filters) that each provide a fraction of the optical power to a fiber 602, 604 going to subscribers (to the left). These subscribers have receive/transmit units (ONUs, not shown here) that receive the downstream information and send upstream information at a different wavelength, for instance 1310 or 1610 nm.

The upstream information is passed by the optical components and reaches a multimode combiner (MMC) 608 that combines all the inputs into a larger core multimode fiber such that all the light provided at the input to the MMC coupler is preserved in the larger core fiber. The signal is then provided to a large area detector (PD) in receiver 610 providing a signal to an amplifier that drives a transmitter (TX) 612, sending a signal to the WDM combiner (WDM) 614 that is connected to a fiber 616 that leads to the head-end. It is noted that for detecting a multimode fiber signal from a large core fiber output from MMC 608, implicitly a larger detector is needed than for detecting a single mode fiber signal. The large area detector in RX 610 has increased capacitance and this can limit the bandwidth of the receiver. However, this implementation can have practical implementations that still meet the requirements. An alternate embodiment uses multiple detectors per the transmission line structure disclosed herein.

Figure 7:
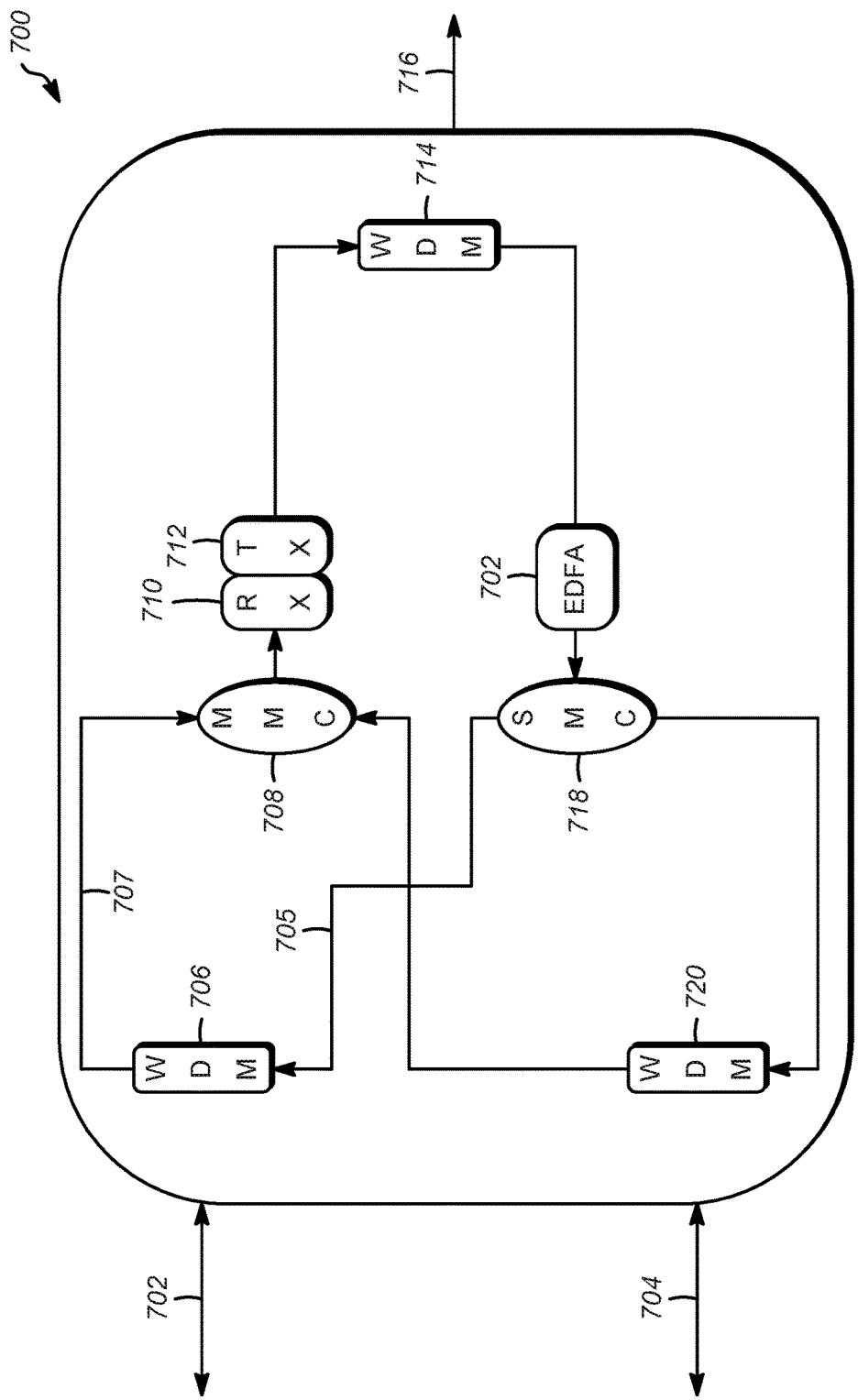
FIG. 7 depicts use of a multi-mode combiner similar to the topology shown in FIG. 6, further including an EDFA.

FIG. 7 depicts use of a multi-mode combiner similar to the topology shown in FIG. 6, also including an EDFA 702. It should be recognized that if a small amount of power is provided to power a receive/transmit 710/712 function, then further power may be provided to an EDFA 702. Thus an active splitter combiner 700 can be provided that resolves not only the upstream bottlenecks of an RFoG system but also the downstream limitations, by providing amplification in the downstream path. This can be done with an EDFA 702 in the downstream signal path as shown in FIG. 7.

The improvements recognized by the embodiments disclosed herein have major implications for the applicability of RFoG networks with high split ratios. Traditional RFoG networks can have fiber lengths up to 25 km and a split ratio of 32 (32 ONUs on one headend receiver) due to the optical power budget, 25 km of fiber and a 32 split causes up to about 24 dB of loss. With a 3 dBm ONU transmitter that results in −21 dBm on the headend receiver which is barely enough to make the system work. In the disclosed techniques, we can use up to 1000 or more ONUs on one headend receiver by using the active splitter/combiners presented. For example, now for the first time, split ratios significantly in excess of 32 (for instance 128) combined with long reach (for instance 40 km runs between headend and active splitter) can be realized. Whereas RFoG was defined around the PON standard that can only handle short reaches (25 km) and also struggles with split ratios, the addition of such disclosed active splitters gives RFoG greater reach and split capability than PON at much higher throughput capacity than PON.

Figure 8:
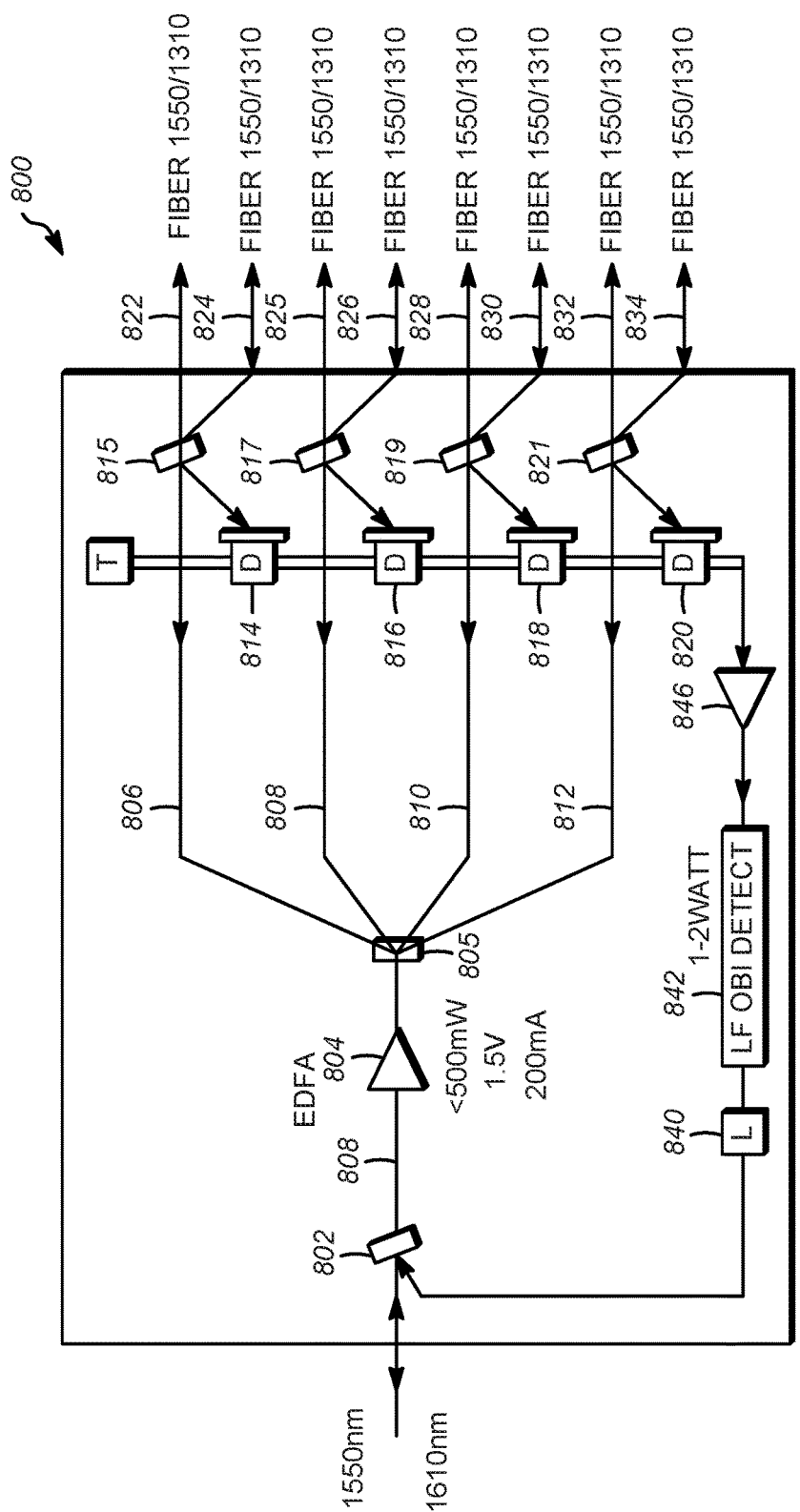
FIG. 8 depicts an active splitter embodiment with detectors and integrated wavelength selective optics.

FIG. 8 depicts an active splitter embodiment with detectors and integrated wavelength selective optics. Inputs to the splitter 800 may be received from a headend. WDM component 802 may split the 1550 nm and 1610 nm wavelengths. The forward signal 808 may be provided to the EDFA 804 feeding a splitter 805. The splitter 805 provides light to the output fibers 806, 808, 810, 812, each feeding a splitter/combiner 815, 817, 819, 821 connected to fibers 822, 824, etc. In embodiments, one or more output fibers can exist per splitter, such as fibers 822 and 824 output from splitter 815.

In the reverse, upstream light is split by the same splitters 815, 817, 819, 821, half of it is provided to the detectors (D) 814, 816, 818, 820 where the detectors have a coating that reflects 1550 nm such that the detectors are insensitive to spurious reflections of the upstream signal.

FIG. 8 illustrates an implementation of the disclosed active splitter where the WDM components (e.g., WDM components 424, 426, 428, and 430 as depicted in FIG. 4) have largely been removed from the active splitter. FIG. 8 illustrates an active splitter with mixed passive/active splitters for OBI mitigation. This implementation requires at least one passive split e.g., via splitters 815, 817, 819, 821 following the active splitter. The usually terminated port of the passive splitter 815, 817, 819, 821 (all splitters are in principle 2×2 devices but usually one port is terminated) is provided to the detectors. Thus the modifications to the N-input active receiver may be the addition passive splitters to the right.

In embodiments, the detectors have a coating that reflects the 1550 nm forward wavelength (i.e., light coming from the headend); through reflections some fraction of the forward signal could otherwise end up in the return band. This is not a problem with conventional RFoG where the forward and return frequency bands do not overlap. However, with extended bandwidth RFoG these bands may overlap and then the forward signal would act as a noise source for the return signals. Under normal conditions there is no reflection of the forward signal (left to right). However in case the fiber to the detectors, such as 822, has an imperfection then it can reflect some of the downstream light back towards the active splitter and thus travel from right to left.

An alternative method to reject the long forward wavelength is to use detectors with a higher bandgap that is not sensitive to 1550 nm. Such detectors fundamentally should have the same cost as other InGaAs(P) based detectors but volume considerations may make the detector coating preferable. In case both fibers e.g., 822 and 824, 825 and 826, 828 and 830, 832 and 834 from the splitter are sent to subscribers, then two subscribers can be transmitting to the same detector at the same time and OBI could occur. This can be resolved by assigning two different wavelengths to those subscribers or active OBI detection can be added resulting in a signal sent to upstream laser L 840, with a small fraction of the signal on the upstream laser L 840 allowed to pass downstream through WDM 802 and then the EDFA 804, and the OBI event can be signaled to the subscribed group such that the ONUs can adjust their wavelength(s) as needed. The same concept described here can be expanded to for instance a 4× split by splitters 815, 817, 819, 821, a compromise where the active OBI management mentioned above still works well and losses are not too high to prevent good SNR.

As discussed, the implementation shown in FIG. 8 may not be OBI free. However for low passive split factors, a low cost implementation of dynamic wavelength shifting may converge very rapidly to no OBI at all. It should be noted that the active splitter relieves the fiber budget, greater distances can be covered, and there is a significant reduction in total EDFA power required in the system, headend EDFA count and power in optical fibers such that SBS is no longer a limiting factor. In conventional RFoG systems with passive splitters SBS is a limiting factor.

The LF OBI detect 842 uses a lower 5 MHz band to detect out of band noise created by the OBI. When the OBI occurs the return laser (L) 840 may be modulated with a low frequency carrier (or an existing LF carrier is phase modulated) and a fraction of that signal may pass through the EDFA 804 into the forward path. This carrier can be in the 500 kHz-4 MHz range. Such a signal may be readily detected by the ONU with low-cost means and the ONU can take action if needed by shifting its wavelength in case it was involved in an OBI event.

In embodiments, the return laser (L) 840 signal is suppressed apart from this carrier to ensure that the headend is not affected by the OBI such that the headend can still combine the signals from other active splitters and only the users to the right of splitter 800 are affected. Because in this case only 2 . . . 8 ports (e.g., two ports that are passively combined for instance, are ports 822, 824) are passively combined it is relatively easy to arrive at an OBI-free state. Even with FP lasers (Fabry-Perot lasers, which are a low cost laser type with poor wavelength stability) OBI free operation can be guaranteed with a small number of passive splits (2 . . . 4) by splitters 815, 817, 819. 821 to the right of the detectors.

The passive splitters shown in FIG. 8 may induce loss at the ports to the detectors 814, 816, 818, 820, but reduce the cost of detectors and WDMs required per port. The LF OBI detect circuit 842 as shown in FIG. 8 may be added for signaling based on OBI detection and for providing the signal to the return laser. In embodiments, the return wavelength may be shifted to 1610 nm, as shown in FIG. 8, or 1310 nm.

Guaranteed non-OBI operation may be preferred in most cases; in such implementations the detectors may still benefit from optical filtering to reject the forward wavelength by, for example, rejecting unwanted reflections of forward path signals that could otherwise be detected.

Figure 9:
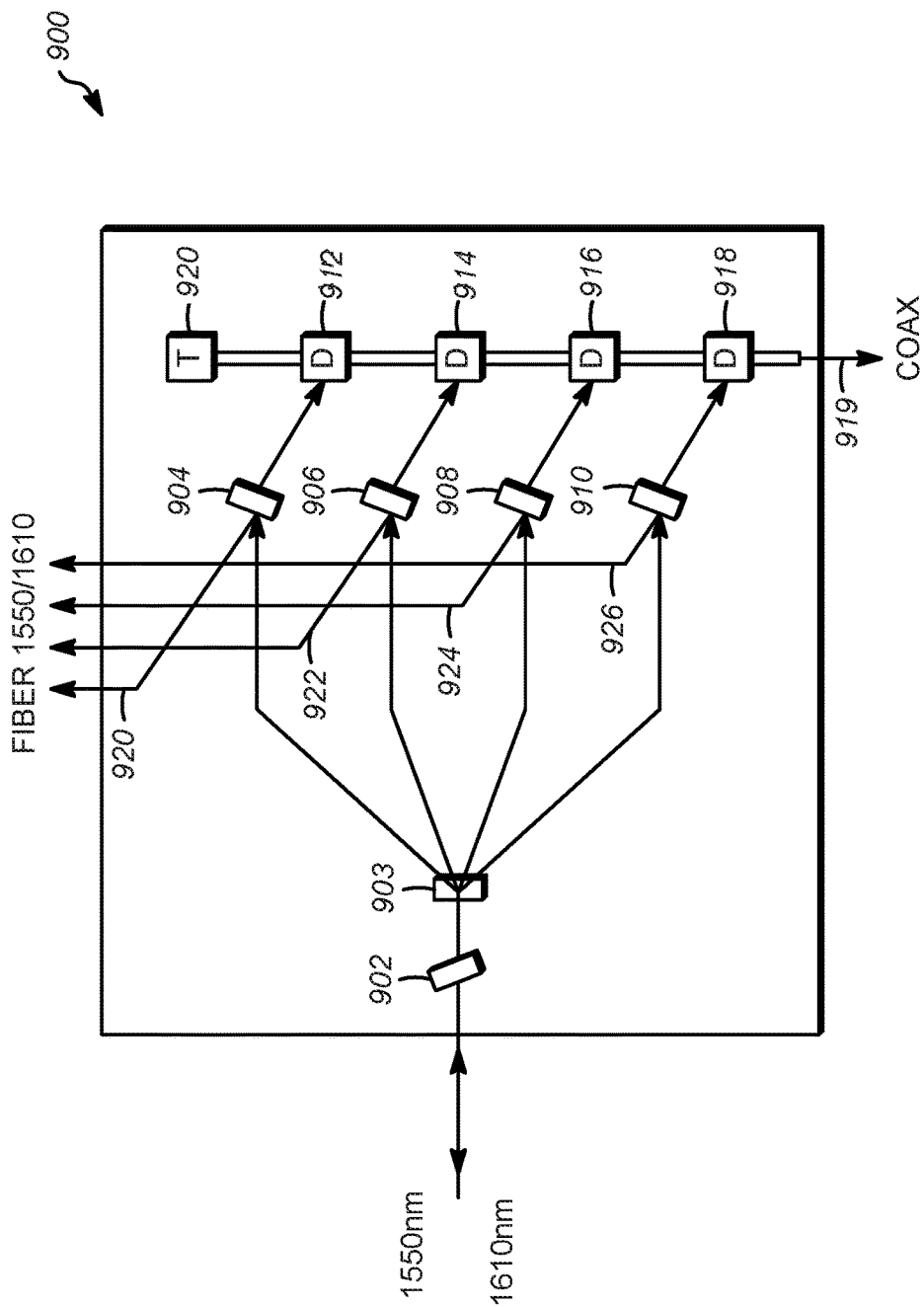
FIG. 9 depicts an active splitter embodiment with nm reflectors before the detectors.

FIG. 9 depicts an embodiment with 1550 nm reflectors, i.e., WDMs 904, 906, 908, 910, before the detectors. The WDMs 904, 906, 908, 910 and detectors 912, 914, 916, 918 may be integrated to reflect 1550 nm light and pass 1610 nm light, such that the 1610 nm light reaches the detectors. The 1550 nm forward light is passed by the first WDM 902 to the splitter 903. The splitter 903 divides the light over subsequent WDM components 904, 906, 908, 910 with a high reflection at 1550 nm. The 1550 nm light is passed to the output fibers 920, 922, 924, 926. The 1610 nm coming into the output fibers in a reverse direction of the 1550 nm light (i.e., the fibers shown are bi-directional such that the 1550 nm downstream goes out to the top and 1610 nm upstream light may enter the splitter 900 from the top) is passed by the WDM components 904, 906, 908, 910 and reaches the detectors 912, 914, 916, 918.

Thus, as shown in FIG. 9, the optical splitter/combiner may pass the PON architecture wavelengths fully i.e., the optical signals for PON wavelengths do not enter the detectors and pass through the passive optical splitter without further processing. The multiple detectors are configured to receive an RFoG specific wavelength band around 1610 nm and pass all other wavelengths to and from the active splitter, where passing refers to not processing all other wavelengths to and from the active splitter but rather allowing them to pass through the passive splitter 805 or 903.

While the arrangements depicted in FIG. 9 may be desirable, the 1550 nm light reflected by the WDM components (such as thin film filters), as shown in FIG. 9, may result in a small amount of 1550 nm light leaking through (such as −15 dB) and reaching the detectors 912, 914, 916, 918. The leaked 1550 nm light can induce signal leakage between the forward and reverse path in and out of the active splitter 900, 1000. The signal leakage may degrade the performance of the return path as forward light reaches detectors D. In this context any 1550 nm is forward light, it comes from 902 to 903 to 904 and primarily goes out on 920 but could potentially leak some into 912 in case the WDM 904 is not working well. The concern of degradation exists for implementations relying on the rejection of light, e.g., the 1550 nm light in FIG. 9, that instead partly reaches a detector (i.e., instead of specifically directing the desired light, e.g., 1610 (or 1310) nm light in FIG. 9, to the detectors).

Figure 10:
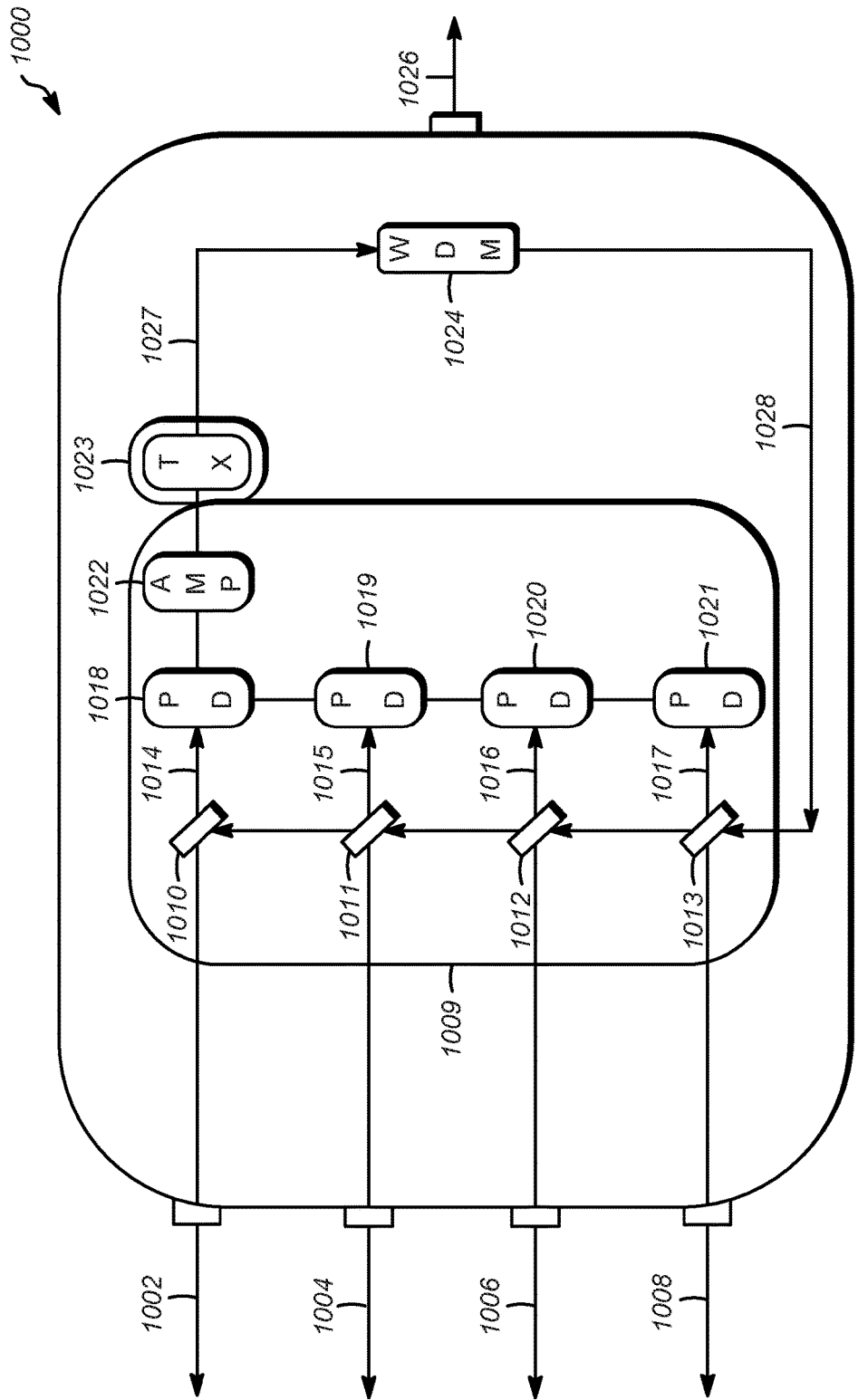
FIG. 10 illustrates a multiple detector receiver embodiment with an active splitter/combiner.

As shown in the embodiment of FIG. 9, forward light may be directed to the detector at the full input power to for instance WDM 904 that could leak light from splitter 903 to detector 912, wherein in the FIG. 10 shown below, only unwanted reflections of forward light 1028 to WDMs such as WDM 1013 may be directed to detectors such as 1021. Thus, the embodiment of FIG. 9 may be desired for simplicity, but considerations may make 1550 nm reflectors placed in front of detectors such as shown in FIG. 8 a more useful embodiment.

FIG. 10 illustrates a multiple detector receiver embodiment with an active splitter/combiner, where the headend is to the right and subscribers are to the left. FIG. 10 depicts coupling fractions of downstream light 1028 with WDM components (1010, 1011, 1012, 1013) to fibers (1002, 1004, 1006, 1008) and passing upstream light from fibers to detectors (1018, 1019, 1020, 1021), with such optical arrangements and multiple detectors cascaded in a transmission line receiver structure. FIG. 10 illustrates an arrangement of thin filter components with power coupling ratios, which are explained below with respect to FIG. 11. In FIG. 10, light from the subscribers enters left to right and passes into the thin film filters (e.g., WDM filters) such as 1010 to be detected at photodiodes such as 1018. Thus, downstream light passes from right to left, for instance at a wavelength of 1550 nm. In the downstream direction, the light may first be separated from upstream light, for instance at a wavelength of 1310 or 1610 nm on a WDM 1024 (Wavelength Division Multiplexing) component. The downstream light at 1028 is then provided to optical components 1010, 1011, 1012, 1013 (such as thin film filters) that each provide a fraction of the optical power to a fiber 1002, 1004, 1006, 1008 going to subscribers. These subscribers have receive/transmit units (ONUs, not shown here) that receive the downstream information and send upstream information at a different wavelength, for instance 1310 or 1610 nm.

The upstream information also passes over fibers 1002, 1004, 1006, 1008, then passed by the optical components 1010, 1011, 1012, 1013 and reaches the detectors (PD) 1018, 1019, 1020, 1021 that are arranged in a transmission line structure (such as that shown in FIGS. 3, 5, 8, and 9) providing a signal to an amplifier (AMP) 1022 that drives a transmitter (TX) 1023, sending a signal to the WDM combiner (WDM) 1024 that is connected to a fiber 1026 that extends to the head-end (not shown).

Figure 11:
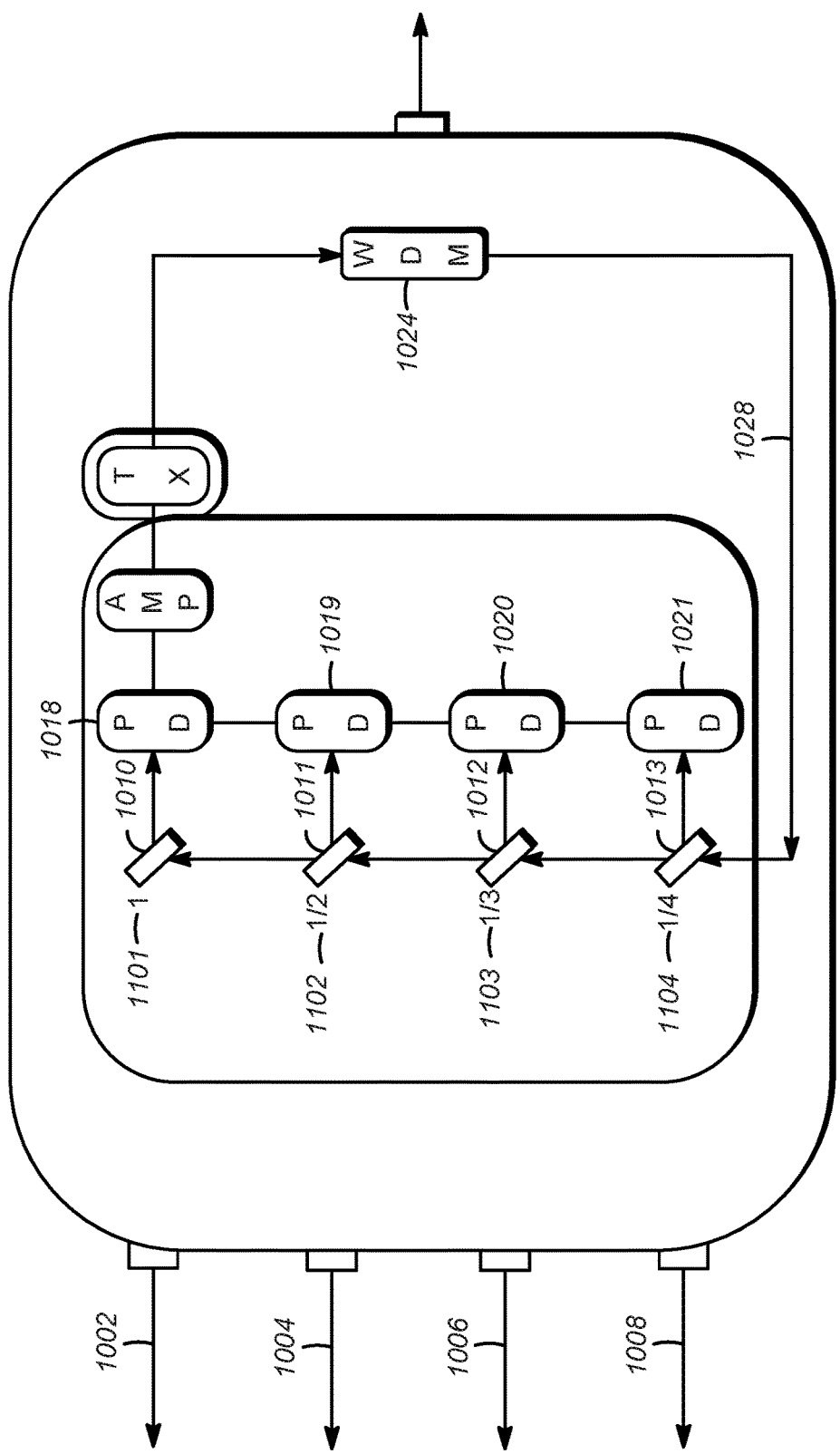
FIG. 11 illustrates the multiple detector receiver of FIG. 10 but illustrating example scaling of power coupling ratios.

FIG. 11 illustrates the multiple detector receiver of FIG. 10 but illustrating example scaling of power coupling ratios. The downstream wavelength 1028 (for instance at 1550 nm) may need to be power divided over the fibers to the ONU via fibers 1002, 1004, 1006, 1008. In order to do this the WDM 1024 components could benefit from partial reflectivities at the downstream wavelength; the example shown in FIG. 11 includes reflectivity numbers 1101, 1102, 1103, 1104 appropriate to achieve this goal. The downstream light comes in from the right, e.g., light 1028, to the first reflector 1013. It is noted that in this context, a reflector is a component with a reflection at a desired wavelength or wavelength range that passes other wavelengths. Reflector 1013 in this embodiment is depicted with only a 25% reflection, and thus ¼th of the power is directed to the first output fiber 1008 whereas ¾th is passed to the next reflector 1012. The next reflector 1012 has ⅓rd reflectivity directing ⅓*¾=¼th of the power to the next fiber 1006 and passing ⅔*¾=½ of the power. The following reflector 1011, with ½ reflectivity directs ¼th of the power to the next fiber 1004 and passing ¼th to the last reflector 1010 that has a high reflection to direct the remaining light (¼th) to the last fiber 1002. Thus, FIG. 11 demonstrates wavelength selective components with fractional reflections at one or more downstream wavelengths, increasing from a value of (1−N)/N, where N is the number of output ports up to 1.

For upstream light (for instance at a wavelength of 1610 nm or 1310 nm) the reflectors 1010, 1011, 1012, 1013 have little effect and the upstream light is directed to the detectors (PD) 1018, 1019, 1020, 1021.

Figure 12:
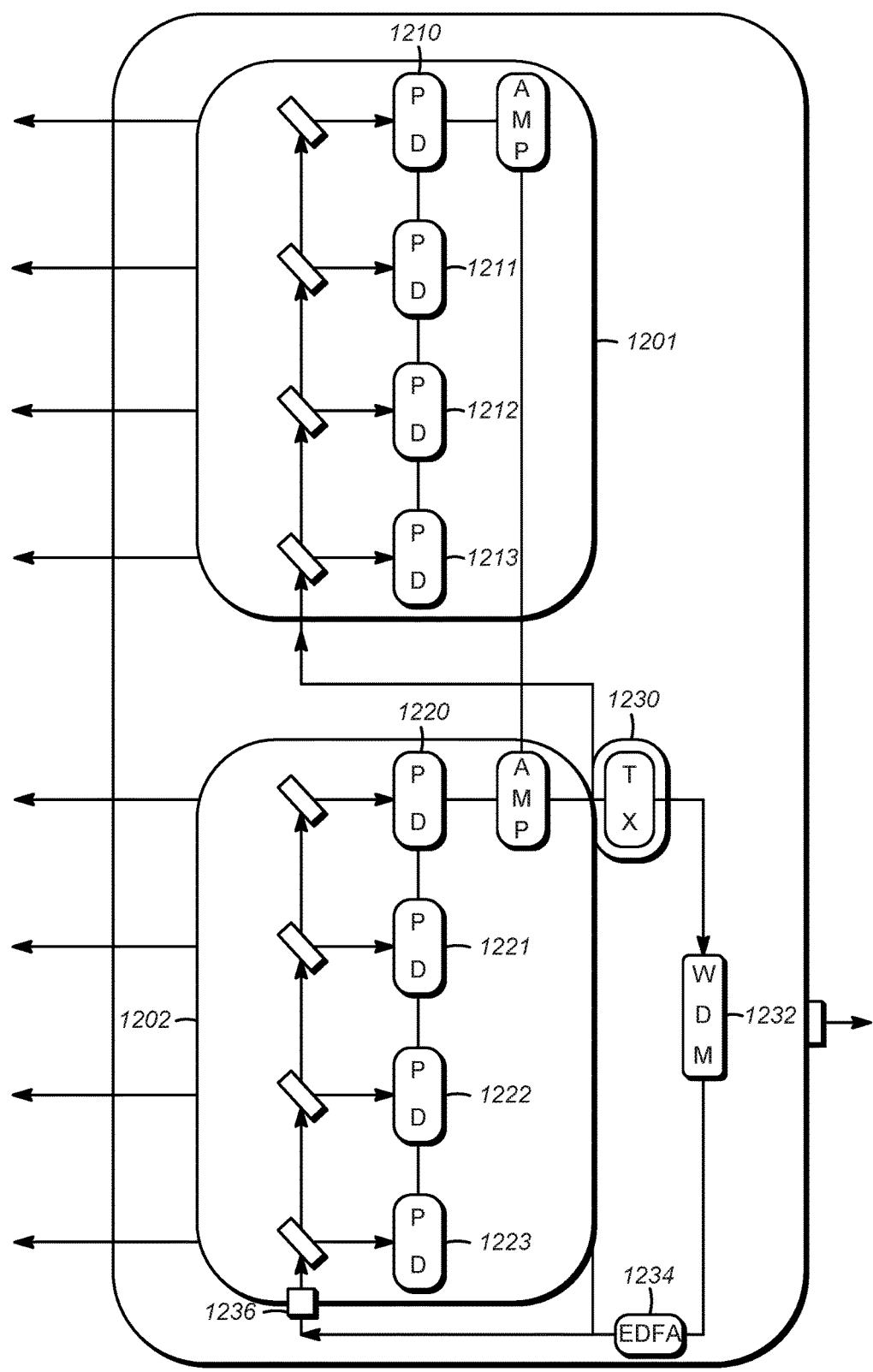
FIG. 12 depicts an example of combining receiver blocks from FIGS. 10 and 11.

FIG. 12 depicts an example of combining blocks from FIGS. 10 and 11. In the forward direction, an EDFA 1234 can amplify a forward wavelength such as 1550 nm, provide it to a splitter 1236 that distributes power over two active splitter blocks 1201, 1202, each splitter block constructed as discussed previously. The photodiode (PD) strings 1210-1213 and 1220-1223 in the receiver blocks (PD strings 1210-1213, for instance, from a transmission line are receiver blocks) can be amplified within the active splitter blocks 1201, 1202 respectively as shown above. Alternately, the photodiode (PD) strings 1210-1213 and 1220-1223 may be combined passively because the detectors are arranged in a transmission line topology. Transmission lines may be concatenated without loss of functionality (apart from attenuation at very high frequencies due to losses). While FIG. 12 depicts two amplifiers, the above describes how multiple blocks, e.g., 1201, 1202 can be combined and provided to a single amplifier driving the transmitter (Tx) 1230. A WDM (WDM) component 1232 splits and combines the upstream and downstream wavelengths.

Often RFoG systems are installed with the intent to replace them with PON systems in the long run. In order to do so, it may be desirable that the splitters and combiners that have been installed are re-usable. In other cases, the priority is to install RFoG systems with the lowest cost possible. As described above, in the upstream, RFoG can use 1610 nm or 1310 nm. 1310 nm is also reserved for PON operation and therefore often 1610 nm is often chosen for RFoG. As described above, downstream RFoG may be 1550 nm. A closer examination of the embodiments described above, e.g., the FIG. 4 embodiment integrating into WDM components or the FIG. 5 embodiment related to the EDFA addition to WDM), illustrate that when 1610 nm is directed towards the detectors, such a device will be sensitive only to 1610 nm. The FIG. 8 embodiment shown above with the passive splitter (embodiment related to the EDFA addition to WDM) is for all other wavelengths and therefore fully compatible with PON. For some embodiments, a bypass would need to added around the EDFA for all wavelengths other than 1550 nm to make it PON compatible.

If the design priority is to install the lowest cost RFoG implementation, then 1310 nm upstream transmission may be used for RFoG. Then, either the WDM components as those shown in FIG. 8 may direct 1310 nm to the detectors or one of the other embodiments can be used. Similar considerations apply to the embodiments related to using a multimode coupler (MMC) such as that shown in FIG. 6 and using a MMC with an EDFA such as that shown in FIG. 7.

Embodiments using 1550 nm (or a suitable downstream wavelength) reflectors on the other hand e.g., as shown in FIG. 8 may be configured to receive both 1610 and 1310 nm upstream transmissions and thus permit maximum freedom in the RFoG upstream wavelength selection. Such reflector embodiments may be more limiting in the downstream wavelength range (unless the reflectors are more complicated thin film optics used with wavelength bands).

Thus, as described herein, either style of implementation has its own merits for different reasons. Directing a beam of light is typically done with much better rejection of unwanted light, such as −40 dB or better, than rejecting/blocking unwanted light. FIGS. 10 and 11 depict active splitter/combiner designs that are capable of passing the PON architecture for particular wavelengths. FIG. 13 illustrates example PON wavelengths that may be desirable to pass unprocessed by the detectors depicted in FIGS. 10 and 11. FIG. 13 illustrates example embodiments for PON pass through capabilities, including wavelength reciprocity for wavelengths other than 1610 nm. For example, the active splitter may behave as a passive splitter/combiner at wavelengths other than 1610 and 1550 nm; that is wavelengths other than the 1600-1620 nm band and wavelengths other than the 1530-1560 nm band may pass the PON architecture, i.e., passed through the detectors without any processing.

Within embodiments, detectors are configured to receive a wavelength band around 1310 nm. within embodiments, detectors are configured to receive all wavelengths except a band around 1550 nm Because the transmission line receiver disclosed herein may result in a 32-input receiver with just a single amplifier, there may be low power dissipation so that many low-power options become available to power it. Example powering options are provided below:

If RFoG is in an MDU: Use the MDU power with UPS and battery backup for the active splitter If RFoG is a New Build: Pull Copper along with Fiber to light up the Active Splitter along with a battery backup If RFoG is and extension to HFC: Siphon power from the HFC plant along with a battery backup If RFoG is on a Utility Pole: Siphon power from the Utility company along with a battery backup An RFoG can be co-located with the Wireless Access Points. An RFoG active filter can have Solar Power. RFoG can have Fiber Power, either as a SM fiber pumping or as MM fiber pumping from the ONU or from the Headend or another node.

A combiner as described herein that is positioned between the CMTS and ONU, not part of either. The combiner converts RFoG to an active network.

The combiner of embodiment 1 that is PON compatible.

A transmission line receiver with a 75 Ohm impedance of the transmission line. A differential transmission line may also be formed using photodetectors and inductors. A balanced transmission line with 100 Ohm differential impedance 100 ohm differential-matching.

Embodiments are described including wavelength reciprocity other than 1610 nm. In embodiments, the active splitter behaves as a passive splitter/combiner at wavelengths other than 1610 and 1550 nm; that is wavelengths other than the 1600-1620 nm band and wavelengths other than the 1530-1560 nm band.

In embodiments described above, EDFAs may pass all wavelengths other than 1610 nm and 1550 nm around the EDFA. In embodiments, there are WDMs at least one before and at least one after the EDFA and on both sides they may pass wavelengths around the EDFA In embodiments, optical alignments pass the PON architecture fully. In embodiments, optical splitters have integrated detectors configured to receive a wavelength band around 1610 nm and pass all other wavelengths to and from the active splitter. The splitter function may be realized with reflectors such as micro-optic mirrors with fractional reflections such that an equal split fraction is realized to each of multiple splitter ports (such as that shown by reflectors 1010, 1011, 1012, 1013 in FIG. 11).

An optical receiver with multiple detectors with said detectors concatenated in a transmission line structure with a characteristic impedance and with inductive matching elements matching the parasitic capacitance of the detectors to said impedance and with at least one side of the transmission line connected to an amplifier. Thus, the noise figure may be dominated by the transmission line impedance and thus it is worse than in many other single detector receiver architectures but generally better than multiple detector receivers with RF combining. Our analysis that shows that use of such a receiver can be beneficial in an RFOG system when compared to passive optical combining before a receiver with an optimized noise figure.

As above with at least one side of the transmission line terminated with an impedance matching the characteristic impedance of the transmission line.

As one of the above with at least one optical transmitter re-transmitting the RF signal put out by the amplifier.

An RFoG system with an optical receiver as one of the above, receiving wavelengths sent upstream by ONUs (home terminating RFoG equipment with transmit and receive functions)

As above with a downstream wavelength that is transmitted to the ONUs

As above with an EDFA that amplifies the downstream wavelength

As any of the above with a solar panel and battery backup providing power to the receiver amplifier and transmitter and optionally the EDFA An active optical splitter, comprising a transmission line receiver and an EDFA as described herein. The EDFA can have a bypass implemented with WDM components for wavelengths not amplified or intended to be handled by the EDFA.

The above splitter where there is at least one multimode combiner.

An active splitter where the wavelength selective components have fractional reflections at the downstream wavelength that increase from a value of $(1-N)/N$ where $N$ is the number of output ports up to 1.

In one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

We claim:

1. A method implemented in an optical splitter/combiner said method comprising:
   splitting optical signals by the optical splitter/combiner, operable as a passive splitter in a downstream path for receipt by one or more wavelength division multiplexers (WDMs) using a first plurality of fiber links;
   by the one or more WDMs, separating upstream optical signals received over a second plurality of fibers from the downstream optical signals received over a first plurality of fibers and configured for selectively directing upstream optical signals of different wavelengths along different paths, wherein optical signals having a first wavelength are directed from the one or more WDMs towards multiple detectors and optical signals having a second wavelength are directed towards the passive splitter over the first plurality of fiber links;
   detecting upstream optical signals directed from a respective one of the one or more wave division multiplexers, wherein the detected outputs are combined into a single radio frequency signal and converted to an optical output; and
   receiving the optical output representing the combination of outputs from the multiple detectors at another wavelength division multiplexer (WDM) in a path upstream from the one or more wavelength division multiplexers and reflecting the optical output upstream.

2. The method of claim 1, wherein the multiple detectors are concatenated in a transmission line, wherein at least one side of the transmission line comprising the multiple detectors terminates with an impedance matching a characteristic impedance of the transmission line.

3. The method of claim 2, wherein the transmission line has inductive matching elements for matching a parasitic capacitance of the multiple detectors to said impedance.

4. The method of claim 1, further comprising an amplifier, wherein at least one side of the transmission line is connected to the amplifier.

5. The method of claim 4, further comprising at least one optical transmitter re-transmitting the single radio frequency signal after amplification by the amplifier.

6. The method of claim 5, further comprising at least one of an electrical power connection, a solar panel or battery backup for providing power to at least one of the amplifier or transmitter.

7. The method of claim 1, wherein at least one of the upstream optical signals received by the optical splitter/combiner is an upstream optical signal that has not been radio frequency combined.

8. The method of claim 1, further comprising an Erbium Doped Fiber Amplifier (EDFA) for amplifying the downstream optical signal prior to the split.

9. The method of claim 1, further comprising an Erbium Doped Fiber Amplifier (EDFA), in the downstream path before the passive splitter, the EDFA amplifying downstream signals in a first wavelength band and bypassing one or more downstream signals in a wavelength band different from the first wavelength band around the EDFA to the passive splitter.

10. The method of claim 9, wherein the bypass enables passive optical network (PON) compatibility by passing PON wavelengths to the passive splitter.

11. The method of claim 1, further comprising wavelength selective components in each of the one or more wave division multiplexers for fractional reflections at one or more downstream wavelengths, increasing from a value of $(1-N)/N$, where N is a whole number of WDM output ports of at least 1.

12. The method of claim 1, wherein the optical splitter/combiner is positioned between a cable modem termination system (CMTS) and an optical network unit (ONU) and converts a radio frequency over glass (RFoG) network to an active network.

13. The method of claim 1, wherein the multiple detectors are concatenated in a transmission line, and wherein the transmission line structure has a 100 ohm or lower impedance of the transmission line.

14. The method of claim 1, wherein the multiple detectors are concatenated in a transmission line, and the detectors are photodetectors and the transmission line is formed using a multiple photodetectors and matching inductors.

15. The method of claim 1, wherein the multiple detectors are concatenated in a transmission line, and wherein the transmission line is balanced with a 100 ohm or higher differential impedance.

16. The method of claim 1, wherein the multiple detectors are concatenated in a transmission line, and wherein the multiple detectors are configured with WDM selective components to receive a wavelength band around 1610 nm and directing all other wavelengths away from a detector functionality of the multiple detectors.

17. The method of claim 16, further comprising an additional one or more detectors configured to receive a wavelength band around 1310 nm.

18. The method of claim 16, further comprising an additional one or more detectors configured to receive all wavelengths except a band around 1550 nm.

19. The method of claim 1, wherein the one or more WDMs include micro-optic mirrors with fractional reflections for equally fractioning downstream light.

20. The method of claim 1, further comprising splitter and wavelength selective components for:
reflecting downstream light of a first wavelength band away from the multiple detectors to output fibers, and
passing upstream light from an output fiber of a second wavelength to the multiple detectors that provide a signal to at least one upstream transmitter.

21. The method of claim 1, further comprising splitter and wavelength selective components for:
passing upstream light from one or more output fibers at wavelengths in at least a first wavelength band to the multiple detectors that provide a signal to at least one upstream transmitter, and directing light from the at least one upstream transmitter to an input fiber, and
directing downstream and upstream light at a wavelength outside the first wavelength band from the input and output fibers through a passive splitter without modification to the downstream and upstream light.

22. The method of claim 1, further comprising splitter and wavelength selective components for:
directing upstream light from one or more output fibers at wavelengths in at least a first wavelength band to the multiple detectors that provide a signal to at least one upstream transmitter, and directing light from the at least one upstream transmitter to an input fiber, and
passing downstream and upstream light at a wavelength outside the first wavelength band from the input and output fibers and at least one upstream transmitter through a passive splitter.

23. The method of claim 1, wherein the multiple detectors are concatenated in a transmission line, and where an output of a transmission line receiver structure in a first optical splitter/combiner is connected to an input of a transmission line receiver structure in a second optical splitter/combiner.

24. An optical splitter/combiner comprising:
one or more wave division multiplexers (WDMs) for receiving upstream optical signals in a first wavelength band and in a second wavelength wavelength band from the second wavelength band;
a passive splitter and another wave division multiplexer following the one or more wave division multiplexers in an upstream path, the passive splitter for splitting a downstream optical signal and the another WDM for combining upstream optical signals in the second wavelength band from the one or more wave divisional multiplexers, the split and combined signals remaining in an optical domain; and
multiple detectors, each detector receiving a respective one of the received upstream optical signals in the first wavelength band,
wherein outputs from the multiple detectors are combined into a single radio frequency signal for upstream transmission by the another WDM.

25. The optical splitter/combiner of claim 24, further comprising a transmission line receiver structure for connecting the multiple detectors for the summing of outputs from the multiple detectors into the single radio frequency signal.

26. The optical splitter/combiner of claim 24, wherein a bypass enables passive optical network (PON) compatibility by bypassing all wavelengths other than those in a 1600-1620 nm band or in a 1530-1560 nm band such that they are passed through the passive splitter.

27. The optical splitter/combiner of claim 26, wherein at least one of the one or more wave division multiplexers (WDM) is located before and at least one of the one or more WDMs is located after an Erbium Doped Fiber Amplifier (EDFA) the WDMs located before and after the EDFA for bypassing the wavelengths around the EDFA.

28. The optical splitter/combiner of claim 24, wherein the multiple detectors are configured to receive a wavelength band around 1610 nm and pass all other wavelengths.

29. The optical splitter/combiner of claim 24, further comprising splitter and wavelength selective components for:
directing upstream light from one or more output fibers at wavelengths in at least a first wavelength band to the multiple detectors that provide a signal to at least one upstream transmitter, and directing light from the at least one upstream transmitter to an input fiber, and
passing downstream and upstream light at a wavelength outside the first wavelength band from the input and output fibers and at least one upstream transmitter through a passive splitter without modification to the downstream and upstream light.

* * * * *